US010611862B2

(12) United States Patent
Ricci et al.

(10) Patent No.: US 10,611,862 B2
(45) Date of Patent: Apr. 7, 2020

(54) PROCESS FOR THE PREPARATION OF (CO)POLYMERS OF CONJUGATED DIENES IN THE PRESENCE OF A CATALYTIC SYSTEM COMPRISING A VANADIUM BIS-IMINE COMPLEX

(71) Applicant: versalis S.p.A., San Donato Milanese (MI) (IT)

(72) Inventors: Giovanni Ricci, Parma (IT); Giuseppe Leone, Milan (IT); Anna Sommazzi, Novara (IT); Francesco Masi, Sant'Angelo Lodigiano (IT)

(73) Assignee: versalis S.p.A., San Donato Milanese (MI) (IT)

( * ) Notice: Subject to any disclaimer, the term of this patent is extended or adjusted under 35 U.S.C. 154(b) by 119 days.

(21) Appl. No.: 15/765,811

(22) PCT Filed: Dec. 23, 2016

(86) PCT No.: PCT/IB2016/057991
§ 371 (c)(1),
(2) Date: Apr. 4, 2018

(87) PCT Pub. No.: WO2017/109767
PCT Pub. Date: Jun. 29, 2017

(65) Prior Publication Data
US 2018/0291126 A1 Oct. 11, 2018

(30) Foreign Application Priority Data
Dec. 24, 2015 (IT) .......................... 102015000087762

(51) Int. Cl.
*C08F 4/68* (2006.01)
*C08F 36/04* (2006.01)
(Continued)

(52) U.S. Cl.
CPC .............. *C08F 36/06* (2013.01); *C08F 2/06* (2013.01); *C08F 4/68034* (2013.01);
(Continued)

(58) Field of Classification Search
CPC ...... C08F 4/68034; C08F 36/04; C08F 36/06; C08F 36/08; C08F 136/06; C08F 136/08
See application file for complete search history.

(56) References Cited

U.S. PATENT DOCUMENTS

2015/0329651 A1  11/2015  Ricci et al.

FOREIGN PATENT DOCUMENTS

EP   1367069 A1   12/2003
WO  2014/097199 A1  6/2014

OTHER PUBLICATIONS

International Search Report and Written Opinion dated Mar. 23, 2017, in PCT/IB2016/057991, filed Dec. 23, 2016.
(Continued)

*Primary Examiner* — Caixia Lu
(74) *Attorney, Agent, or Firm* — Oblon, McClelland, Maier & Neustadt, L.L.P.

(57) ABSTRACT

Process for the preparation of (co) polymers of conjugated dienes comprising polymerizing at least one conjugated diene in the presence of a catalytic system comprising at least one vanadium bis-imine complex having the general formula (I): wherein: m is 0 or 1; Z represents a —$CR_5R_6$ group wherein $R_5$ and $R_6$, equal to or different from each other, represent a hydrogen atom; or a $C_1$-$C_{20}$ alkyl group, preferably $C_1$-$C_{15}$, linear or branched; or a bivalent aromatic group optionally substituted; $R_1$ and $R_2$ equal to or different from each other, represent a hydrogen atom; or they are selected from $C_1$-$C_{20}$ alkyl groups, preferably $C_1$-$C_{15}$, linear or branched, optionally halogenated, cycloalkyl groups optionally substituted; or $R_1$ and $R_2$, may be optionally bound each other so as to form, together with the other atoms which they are bound to, a cycle containing from 4 to 6 carbon atoms, saturated, unsaturated, or aromatic, optionally substituted by $C_1$-$C_{20}$ alkyl groups, preferably $C_1$-$C_{15}$, linear or branched, said cycle optionally containing heteroatoms such as, for example, oxygen, sulfur, nitrogen, silicon, phosphorus, selenium; $R_3$ and $R_4$, equal to or different from each other, represent a hydrogen atom; or they are selected from $C_1$-$C_{20}$ alkyl groups, preferably $C_1$-$C_{15}$, linear or branched, optionally halogenated, cycloalkyl groups optionally substituted, aryl groups optionally substituted; or $R_2$ and $R_4$, may be optionally bound each other so as to form, together with the other atoms which they are bound to, a cycle containing from 3 to 6 carbon atoms, saturated, unsaturated, or aromatic, optionally substituted by $C_1$-$C_{20}$ alkyl groups, preferably $C_1$-$C_{15}$, linear or branched, said cycle optionally containing other heteroatoms such as, for example, oxygen, sulfur, nitrogen, silicon, phosphorus, selenium; or $R_1$ and $R_3$, may be optionally bound each other so as to form, together with other atoms which they are bound to, a cycle containing from 3 to 6 carbon atoms, saturated, unsaturated, or aromatic, optionally substituted by $C_1$-$C_{20}$ alkyl groups, preferably $C_1$-$C_1$, linear or branched, said cycle optionally containing other heteroatoms such as oxygen, sulfur, nitrogen, silicon, phosphorus, selenium; $X_1$, $X_2$ and $X_3$, equal to or different from each other, represent a halogen atom such as, for example, chlorine, bromine, iodine, preferably chlorine; or they are selected from $C_1$-$C_{20}$ alkyl groups, preferably $C_1$-$C_{15}$, linear or branched, —$OCOR_7$ groups or —$OR_7$ groups wherein $R_7$ is selected from $C_1$-$C_{20}$ alkyl groups, preferably $C_1$-$C_{15}$, linear or branched; Y is selected from ethers such as, for example, diethylether, tetrahydrofuran (THF), dimethoxyethane, preferably is tetrahydrofuran (THF); n is 0 or 1.

(Continued)

Figure 1:
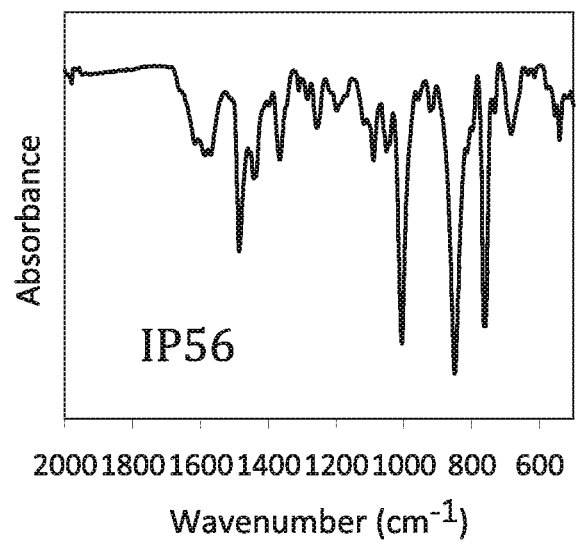

(51) Int. Cl.
C08F 136/06 (2006.01)
C08F 136/08 (2006.01)
C08F 2/06 (2006.01)

(52) U.S. Cl.
CPC ............ *C08F 36/045* (2013.01); *C08F 36/08* (2013.01); *C08F 136/06* (2013.01); *C08F 136/08* (2013.01)

(56) References Cited

OTHER PUBLICATIONS

Colamarco, E. et al. "Homo- and Copolymerization of Butadiene Catalyzed by an Bis(imino)pyridyl Vanadium Complex", Macromolecular Rapid Communications, vol. 25, 2004, p. 450-454, XP 002756020.

Milione, S. et al., "Synthesis of a-diimine V(III) complexes and their role as ethylene polymerisation catalysts", Journal of the Chemical Society, No. 8, 2002, p. 1839-1846, XP 055291312.

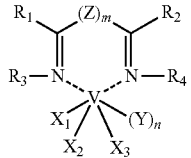

(I)

14 Claims, 24 Drawing Sheets

(51) Int. Cl.
C08F 36/06 (2006.01)
C08F 36/08 (2006.01)
C08F 136/04 (2006.01)

IP79

IP79

US 10,611,862 B2

PROCESS FOR THE PREPARATION OF (CO)POLYMERS OF CONJUGATED DIENES IN THE PRESENCE OF A CATALYTIC SYSTEM COMPRISING A VANADIUM BIS-IMINE COMPLEX

The present invention relates to a process for the preparation of (co)polymers of conjugated dienes.

More in particular, the present invention relates to a process for the preparation of (co)polymers of conjugated dienes comprising polymerizing at least one conjugated diene in the presence of a catalytic system comprising a vanadium bis-imine complex.

It is known that the stereospecific (co)polymerization of conjugated dienes is a very important process in the chemical industry in order to obtain products which are among the most widely used rubbers.

Said stereospecific (co)polymerization can give polymers having different structure, namely trans-1,4 structure, cis-1,4 structure, 1,2 structure and, in the case of asymmetric conjugated dienes (e.g., isoprene), 3,4 structure.

The vanadium-based catalytic systems have been known for a long time in the field of the (co)polymerization of conjugated dienes for their capability of providing diene (co)polymers with a trans-1,4 structure, and these systems are by far the most widely used systems for the preparation of trans-1,4 polybutadiene as described, for example, in: Porri L. et al., "Comprehensive Polymer Science" (1989), Eastmond G. C. et al. Eds., Pergamon Press, Oxford, UK, Vol. 4, Part II, pag. 53-108.

Heterogeneous catalytic systems obtained by combining vanadium halides [e.g., vanadium(III)chloride (VCl$_3$), vanadium(IV)chloride (VCl$_4$)] with aluminium-alkyls [e.g., triethylaluminium (AlEt$_3$), diethylaluminium chloride (AlEt$_2$Cl)], provide a trans-1,4 polybutadiene (content of trans-1,4 units equal to 97%-100%), crystalline, with a high molecular weight, and having a melting point ($T_m$) of about 145° C. Further details related to said catalytic systems can be found, for example, in: Natta G. et al., "La Chimica e L'Industria" (1958), Vol. 40, page 362 and "Chemical Abstract" (1959), Vol. 53, page 195; Natta G. et al., "La Chimica e L'Industria" (1959), Vol. 41, page 116 and "Chemical Abstract" (1959), Vol. 53, page 15619.

Polybutadiene with a high content of trans-1,4 units, but with lower molecular weight, can be prepared with homogeneous catalytic systems such as, for example, vanadium(III)chloride(tris-tetrahydrofuran)/diethylaluminum chloride (VCl$_3$(THF)$_3$/AlEt$_2$Cl), vanadium(III) (tris-acetylacetonate)/diethylaluminum chloride [V(acac)$_3$/AlEt$_2$Cl] and vanadium(III) (tris-acetylacetonate)/methylaluminoxane [V(acac)$_3$/MAO]. Further details related to said catalytic systems can be found, for example, in: Natta G. et al., "Atti Accademia Nazionale dei Lincei—Classe di Scienze fisiche, matematiche e naturali" (1961), Vol. 31(5), page 189 and "Chemical Abstract" (1962), Vol. 57, page 4848; Porri L. et al., "Die Makromoleculare Chemie" (1963), Vol. 61(1), pag. 90-103; Ricci G. et al., "Polymer Communication" (1991), Vol. 32, pag. 514-517; Ricci G. et al., "Journal of Polymer Science Part A: Polymer Chemistry" (2007), Vol. 45(20), pag. 4635-4646.

Some of the above-mentioned homogeneous catalytic systems, for example, vanadium(III) (tris-acetylacetonate)/triethylaluminum [V(acac)$_3$/AlEt$_3$], are of certain interest for the preparation of 1,2 polybutadiene, as described, for example, in Natta G. et al., "La Chimica e L'Industria" (1959), Vol. 41, page 526 and "Chemical Abstract" (1960), Vol. 54, page 1258.

Catalytic systems obtained by combining vanadium cyclopentadienyl derivatives such as, for example, bis(cyclopentadienyl)chlorovanadium/methylaluminoxane (VCp$_2$Cl/MAO) and cyclopentadienyldichloro(tris-triethylphosphine)vanadium(III)/methylaluminoxane [VCpCl$_2$(PEt$_3$)$_3$/MAO], are capable of providing a polybutadiene mainly with a structure cis-1,4 (content of cis-1,4 units equal to about 85%). Further details related to said catalytic systems can be found, for example, in: Ricci G. et al., "Polymer" (1996), Vol. 37(2), pag. 363-365; Porri L. et al., "Metalorganic Catalyst for Synthesis and Polymerization" (1999), Kaminsky W. Ed., Springer-Verlag Berlin Heidelberg, pag. 519-530; Porri L. et al., "Metallocene-Based Polyolefins" (2000), Scheirs J. and Kaminsky W. Eds., John Wiley & Sons Ltd., pag. 115-141.

It is also known that the vanadium-based catalytic systems are also active for the polymerization of isoprene. In particular, the catalytic system trialkyl-aluminum/vanadium(III)chloride (AlR$_3$/VCl$_3$ wherein R=methyl, ethyl, propyl, butyl, preferably ethyl), provides polyisoprene with high content of trans-1,4 units, even if the activity level is rather low. Preferably, said polymerization is carried out by operating at a Al/V molar ratio preferably ranging from 3 to 6, in the presence of an aliphatic solvent (e.g., n-heptane), at relatively low temperature, preferably ranging from 20° C. to 50° C. In fact, operating at temperatures over 50° C., the vanadium-carbon bonds become unstable, the vanadium(III) reduces into vanadium(II) which is an inactive species from the catalytic point of view and the polymerization rate quickly drops.

Recently, in order to improve the stability of the vanadium-based catalytic systems to the temperature, several new systems based on vanadium trichloride complexes with ligands having nitrogen atoms as donor atoms (e.g., pyridin-bis-imines, bis-imines), in combination with suitable alkylating agents [e.g., diethylaluminum chloride (AlEt$_2$Cl)], were studied: interesting and encouraging results were obtained, and these new systems have proved to be active in the homo- and copolymerization of ethylene, providing elastomeric polyolefins of certain interest from the applicative point of view as described, for example, in: Milione S. et al., "Journal of the Chemical Society, Dalton Transactions" (2002), Issue 8, pag. 1839-1846; Redshaw C. et. al, "Olefin Upgrading Catalysis by Nitrogen-based Metal Complexes I", Chapter 4, "Imine-Based Vanadium Catalyst for α-olefin Polymerization" (2011), Giambastiani G. and Cámpora J. Eds., Springer Science+Business Media B. V., pag. 153-195.

Colamarco E. et al., in "Macromolecular Rapid Communications" (2004), Vol. 25, pag. 450-454, disclose a vanadium complex with a nitrogen-containing ligand, i.e. a bis(imino)pyridine vanadium (III) complex activated by different co-catalysts [e.g., diethylaluminum chloride (AlEt$_2$Cl), triethyldialuminum trichloride (Al$_2$Et$_3$Cl$_3$), methylaluminoxane (MAO)] capable of promoting the 1,4 polymerization of butadiene with decisively low values of catalytic activity.

As the (co)polymers of conjugated dienes, in particular polybutadiene and polyisoprene, can be advantageously used for the manufacture of tires, in particular for tire treads, as well as in the footwear industry (for example, in the manufacture of soles for shoes), the study of new catalytic systems capable of providing said (co)polymers is still of great interest.

The Applicant has now found that the preparation of (co)polymers of conjugated dienes, such as, for example, linear or branched polybutadiene or polyisoprene, with a prevalent content of trans-1,4 and cis-1,4 units, i.e. having a content of trans-1,4 and cis-1,4 units ≥65%, preferably ranging from 70% to 90%, can be advantageously carried out in the presence of a catalytic system comprising at least one vanadium bis-imine complex having general formula (I) defined below.

Therefore, it represents an object of the present invention a process for the preparation of (co)polymers of conjugated dienes comprising polymerizing at least one conjugated diene in the presence of a catalytic system comprising at least one vanadium bis-imine complex having the general formula (I):

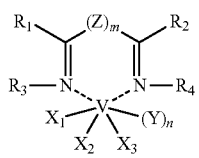

wherein:

m is 0 or 1;

Z represents a —$CR_5R_6$ group wherein $R_5$ and $R_6$, equal to or different from each other, represent a hydrogen atom; or a $C_1$-$C_{20}$ alkyl group, preferably $C_1$-$C_{15}$, linear or branched; or a bivalent aromatic group optionally substituted;

$R_1$ and $R_2$ equal to or different from each other, represent a hydrogen atom; or they are selected from $C_1$-$C_{20}$ alkyl groups, preferably $C_1$-$C_{15}$, linear or branched, optionally halogenated, cycloalkyl groups optionally substituted; or $R_1$ and $R_2$, may be optionally bound each other so as to form, together with the other atoms which they are bound to, a cycle containing from 4 to 6 carbon atoms, saturated, unsaturated, or aromatic, optionally substituted by $C_1$-$C_{20}$ alkyl groups, preferably $C_1$-$C_{15}$, linear or branched, said cycle optionally containing heteroatoms such as, for example, oxygen, sulfur, nitrogen, silicon, phosphorus, selenium;

$R_3$ and $R_4$, equal to or different from each other, represent a hydrogen atom; or they are selected from $C_1$-$C_{20}$ alkyl groups, preferably $C_1$-$C_{15}$, linear or branched, optionally halogenated, cycloalkyl groups optionally substituted, aryl groups optionally substituted;

or $R_2$ and $R_4$, may be optionally bound each other so as to form, together with the other atoms which they are bound to, a cycle containing from 3 to 6 carbon atoms, saturated, unsaturated, or aromatic, optionally substituted by $C_1$-$C_{20}$ alkyl groups, preferably $C_1$-$C_{15}$, linear or branched, said cycle optionally containing other heteroatoms such as, for example, oxygen, sulfur, nitrogen, silicon, phosphorus, selenium;

or $R_1$ and $R_3$, may be optionally bound each other so as to form, together with other atoms which they are bound to, a cycle containing from 3 to 6 carbon atoms, saturated, unsaturated, or aromatic, optionally substituted by $C_1$-$C_{20}$ alkyl groups, preferably $C_1$-$C_{15}$, linear or branched, said cycle optionally containing other heteroatoms such as, for example, oxygen, sulfur, nitrogen, silicon, phosphorus, selenium;

$X_1$, $X_2$ and $X_3$, equal to or different from each other, represent a halogen atom such as, for example, chlorine, bromine, iodine, preferably chlorine; or they are selected from $C_1$-$C_{20}$ alkyl groups, preferably $C_1$-$C_{15}$, linear or branched, —$OCOR_7$ groups or —$OR_7$ groups wherein $R_7$ is selected from $C_1$-$C_{20}$ alkyl groups, preferably $C_1$-$C_{15}$, linear or branched;

Y is selected from ethers such as, for example, diethylether, tetrahydrofuran (THF), dimethoxyethane, preferably is tetrahydrofuran (THF);

n is 0 or 1.

For the aim of the present description and of the following claims, the definitions of the numerical ranges always comprises the extremes unless otherwise specified.

For the aim of the present description and of the following claims, the term "comprising" also includes the terms "which consists essentially of" or "which consists of".

According to a preferred embodiment of the present invention, said catalytic system can comprise at least one co-catalyst (b) selected from organic compounds of an element M' different from carbon, said element M' being selected from elements belonging to the groups 2, 12, 13 or 14 of the Periodic Table of the Elements, preferably from: boron, aluminum, zinc, magnesium, gallium, tin, even more preferably from aluminum, boron.

Generally, the formation of the catalytic system comprising the vanadium bis-imine complex having general formula (I) and the co-catalyst (b), is preferably carried out into an inert liquid medium, more preferably into a hydrocarbon solvent. The choice of the vanadium bis-imine complex having general formula (I) and of the co-catalyst (b), as well as the particular method used, can vary depending on the molecular structures and the desired result, according to that analogously reported in the literature of species accessible to the person skilled in the art for other complexes of transition metals with imine ligands, such as, for example, reported by L. K. Johnson et al, in the "*Journal of the American Chemical Society*" (1995), Vol. 117, pag. 6414-6415, and by G. van Koten et al., in "*Advances in Organometallic Chemistry*" (1982), Vol. 21, pag. 151-239.

According to a further preferred embodiment of the present invention, said co-catalyst (b) can be selected from ($b_1$) aluminum alkyls having general formula (II):

$$Al(X')_n(R_8)_{3-n} \qquad (II)$$

wherein X' represents a halogen atom such as, for example, chlorine, bromine, iodine, fluorine; $R_8$ is selected from linear or branched $C_1$-$C_{20}$ alkyl groups, cycloalkyl groups, aryl groups, said groups being optionally substituted by one or more silicon or germanium atoms; and n is an integer ranging from 0 to 2.

According to a further preferred embodiment of the present invention, said co-catalyst (b) can be selected from organo-oxygenated compounds ($b_2$) of a M' element different from carbon belonging to the groups 13 or 14 of the Periodic Table of the Elements; preferably from organo-oxygenated compounds of aluminum, gallium, tin. Said organo-oxygenated compounds ($b_2$) can be defined as organic compounds of M', wherein the latter is bounded to at least one oxygen atom and at least one organic group consisting of an alkyl group having from 1 to 6 carbon atoms, preferably methyl.

According to a further preferred embodiment of the present invention, said co-catalyst (b) can be selected from ($b_3$) compounds or mixtures of organo-metallic compounds of a M' element different from carbon capable of reacting with the vanadium bis-imine complex having general formula (I) extracting from this a $X_1$, $X_2$ or $X_3$ substituent σ-bound, to form on one hand at least one neutral compound, and on the other hand a ionic compound consisting of a cation containing the metal (V) coordinated by the ligand, and a non-coordinating organic anion containing the M' metal, whose negative charge is delocalized on a multi-center structure.

It is to be noted that for the aim of the present invention and of the followings claims, the term "Periodic Table of the Element" is referred to the "IUPAC Periodic Table of the Elements", version dated 1 Jun. 2012, reported at the following web site: www.iupac.org/fileadmin/user_upload/news/IUPAC_Periodic_Table-1Jun12.pdf.

The term "bivalent aromatic group" means an aromatic carbocyclic group containing one or more aromatic rings. Said bivalent aromatic group can be optionally substituted with one or more groups, equal to or different from each other, selected from: halogen atoms such as, for example, fluorine, chlorine, bromine; hydroxy groups; $C_1$-$C_{12}$ alkyl groups; $C_1$-$C_{12}$ alkoxy groups; cyano groups; amino groups; nitro groups. Specific examples of bivalent aromatic group are: ortho-phenylene, metha-phenylene, methylphenylene, trimethylphenylene, methoxyphenylene, hydroxyphenylene, phenyloxyphenylene, fluorophenylene, chlorophenylene, bromophenylene, nitrophenylene, dimethylamino-phenylene, naphtylene, phenylnaphtylene, phenantrenylene, antracenylene.

The term "$C_1$-$C_{20}$ alkyl groups" means alkyl groups having from 1 to 20 carbon atoms, linear or branched. Specific examples of $C_1$-$C_{20}$ alkyl groups are: methyl, ethyl, n-propyl, iso-propyl, n-butyl, s-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

The term "$C_1$-$C_{20}$ alkyl groups optionally halogenated" means alkyl groups having from 1 to 20 carbon atoms, linear or branched, saturated or unsaturated, wherein at least one of the hydrogen atoms is substituted with an halogen atom such as, for example, fluorine, chlorine, bromine, preferably fluorine, chlorine. Specific examples of $C_1$-$C_{20}$ alkyls groups optionally containing heteroatoms are: fluoromethyl, di fluoromethyl, trifluoromethyl, trichloromethyl, 2,2,2-trifluoroethyl, 2,2,2-trichloroethyl, 2,2,3,3-tetrafluoropropyl, 2,2,3,3,3-pentafluoropropyl, perfluoropentyl, perfluorooctyl, perfluorodecyl.

The term "cycloalkyl groups" means cycloalkyl groups having from 3 to 30 carbon atoms. Said cycloalkyl groups can be optionally substituted with one or more groups, equal to or different from each other, selected from: halogen atoms; hydroxyl groups; $C_1$-$C_{12}$ alkyl groups; $C_1$-$C_{12}$ alkoxy groups; cyano groups; amino groups; nitro groups. Specific examples of cycloalkyl groups are: cyclopropyl, 2,2-difluorocyclopropyl, cyclobutyl, cyclopentyl, cyclohexyl, hexamethylcyclohexyl, pentamethylcyclopentyl, 2-cyclooctylethyl, methylcyclohexyl, methoxycyclohexyl, fluorocyclohexyl, phenylcyclohexyl.

The term "aryl groups" means aromatic carbocyclic groups. Said aromatic carbocyclic groups can be optionally substituted with one or more groups, equal to or different from each other, selected from: halogen atoms such as, for example, fluorine, chlorine, bromine; hydroxyl groups; $C_1$-$C_{12}$ alkyl groups; $C_1$-$C_{12}$ alkoxy groups; cyano groups; amino groups; nitro groups. Specific examples of aryl groups are: phenyl, methylphenyl, trimethylphenyl, metoxyphenyl, hydroxyphenyl, phenyloxyphenyl, fluorophenyl, chlorophenyl, bromophenyl, nitrophenyl, dimethylaminophenyl, naphthyl, phenylnaphtyl, phenanthrene, anthracene.

The term "cycle" means a system containing a ring containing from 3 to 6 carbon atoms or from 4 to 6 carbon atoms, optionally containing, as well as the nitrogen atom, other heteroatoms selected from nitrogen, oxygen, sulfur, silica, selenium, phosphorous. Specific example of cycle are: pyridine, thiadiazole.

According to a preferred embodiment of the present invention, said conjugated diene can be selected, for example, from: 1,3-butadiene, 2-methyl-1,3-butadiene (isoprene), 2,3-dimethyl-1,3-butadiene, 1,3-pentadiene, 1,3-hexadiene, cyclo-1,3-hexadiene, or mixtures thereof. 1,3-butadiene, isoprene, are preferred.

According to a preferred embodiment of the present invention, in said vanadium bis-imine complex having general formula (I):

m is 0;

$R_1$ and $R_2$, equal to or different from each other, preferably equal from each other, are a hydrogen atom; or they are selected from linear or branched $C_1$-$C_{20}$ alkyl groups, preferably they are a methyl group;

$R_3$ and $R_4$, equal to or different from each other, preferably equal from each other, are selected from phenyl groups optionally substituted by linear or branched $C_1$-$C_{20}$ alkyl groups, preferably substituted by one or more methyl, iso-propyl, tert-butyl groups;

$X_1$, $X_2$ and $X_3$, equal to or different from each other, preferably equal from each other, are a halogen atom such as, for example, chlorine, bromine, iodine, preferably chlorine;

n is 0 or 1;

Y is tetrahydrofuran (THF).

The vanadium bis-imine complex having general formula (I) has to be intended, according to the present invention, under any physical form such as, for example, the isolated and purified solid form, the solvated form with a suitable solvent, or that one supported on suitable organic or inorganic solids, preferably having granular or powder physical form.

The vanadium bis-imine complex having general formula (I) is prepared starting from ligands known in the art.

Specific examples of ligands useful for the aim of the present invention are those having the following formulae (L1)-(L8):

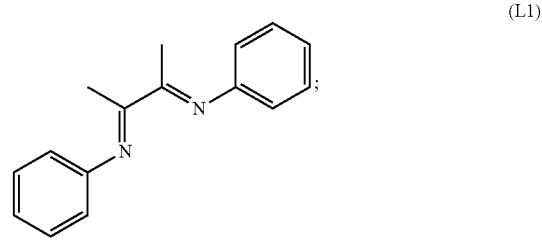

(L1)

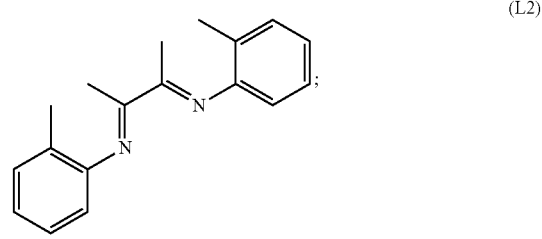

(L2)

(L3)
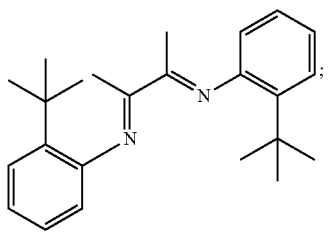

(L4)
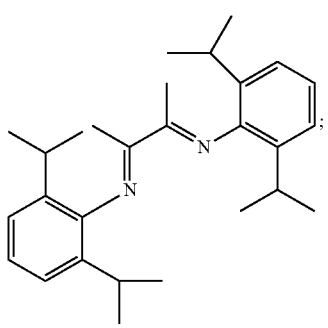

(L5)
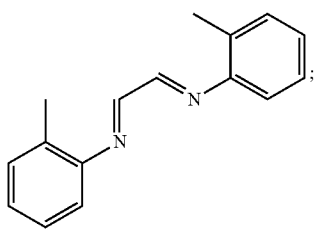

(L6)
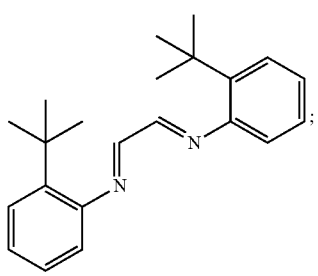

(L7)
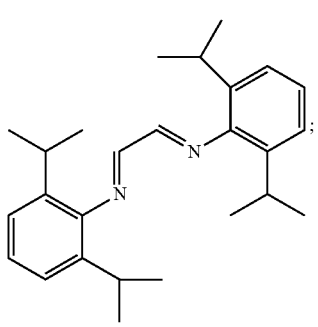

(L8)
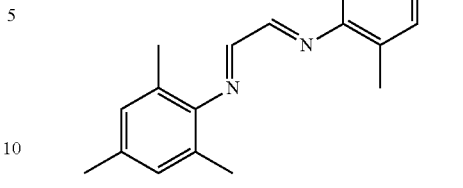

Said ligands having the formulae (L1)-(L8), can be prepared by processes known in the art. For example, said ligands having the formulae (L1)-(L8) can be prepared:

through condensation reactions between primary amines and α,β-diketones as described, for example, by: van der Poel H. et al., in "*Synthetic Communication*" (1978), Vol. 8, pag. 305; Svoboda M. et al., in "*Zeitschrift fuer Naturfoschung*" (1981), Teil B, pag. 814-822; Dieck H. et al., in "*Zeitschrift fuer Naturfoschung*" (1981), Teil B, pag. 823-832; Dieck H. et al., in "*Zeitschrift fuer Naturfoschung*" (1975), Teil B, pag. 922-925;

through condensation reactions between primary amines and glyoxals as described, for example, by: Kliegman J. M. et al., in "*Tetrahedron*" (1970), Vol. 26, pag. 2555-2560; Kliegman J. M. et al., in "*The Journal of Organic Chemistry*" (1970), Vol. 35(9), pag. 3140-3143; Barney V. C. et al, in "*Journal of Chemical Society*" (1953), pag. 3610-3612; Horner L. et al., in "*Chemische Berichte*" (1957), Vol. 90, pag. 2184-2189; Carson J. F. et al., in "*Journal of the American Chemical Society*" (1953), Vol. 75, pag. 4337-4338;

through condensation reactions between primary amines and α-ketoaldehydes as described, for example, by: van der Poel H. et al., in "*Synthetic Communication*" (1978), Vol. 8, pag. 305; Svoboda M. et al., in "*Zeitschrift fuer Naturfoschung*" (1981), Teil B, pag. 814-822; Dieck H. et al., in "*Zeitschrift fuer Naturfoschung*" (1981), Teil B, pag. 823-832;

through condensation reactions between primary amines and β-diketones or β-dialdehydes as described, for example, by: Dove A. P. et al., in "*Dalton Transactions*" (2004), Issue 4, pag. 570-578; Bourget-Merle L. et al., in "*Chemical Reviews*" (2002), Vol. 102, pag. 3031-3065; Budzelaar P. H. et al., in "*European Journal of Inorganic Chemistry*" (2000), Issue 4, pag. 753-769.

The vanadium bis-imine complex having general formula (I) can be prepared according to processes known in the art. For example, said vanadium bis-imine complex can be prepared through the reaction between vanadium compounds having general formula $V(X)_3$ wherein X is an halogen atom such as, for example, chlorine, bromine, iodine, preferably chlorine, as such or complexed with ethers [for example, diethylether, tetrahydrofuran (THF), dimethoxyethane, preferably tetrahydrofuran (THF)], with the ligands having formulae (L1)-(L8) reported above, in a ligand (L)/vanadium (V) molar ratio ranging from 1 to 1.5, by operating, preferably, in the presence of at least one solvent which can be selected, for example, from: chlorinated solvents (for example, methylene chloride), ether solvents [for example, tetrahydrofuran (THF)], alcohol solvents (for example, butanol), hydrocarbon solvents (for example, toluene), or mixtures thereof, at room temperature or higher. The vanadium bis-imine complex thus obtained can be then recovered through the methods known in the art such as, for example, precipitation through a non-solvent (for example, pentane), followed by separation through filtration or decantation and optional subsequent solubilization into a suitable solvent followed by low-temperature crystallization.

For the aim of the present description and of the following claims, the wording "room temperature" means a temperature ranging from 20° C. to 25° C.

Specific example of aluminum alkyls having general formula (II) particularly useful for the aim of the present invention are: tri-methyl-aluminum, tri-(2,3,3-tri-methyl-butyl)-aluminum, tri-(2,3-di-methyl-hexyl)-aluminum, tri-(2,3-di-methyl-butyl)-aluminum, tri-(2,3-di-methyl-pentyl)-aluminum, tri-(2,3-di-methyl-heptyl)-aluminum, tri-(2-methyl-3-ethyl-pentyl)-aluminum, tri-(2-methyl-3-ethyl-hexyl)-aluminum, tri-(2-methyl-3-ethyl-heptyl)-aluminum, tri-(2-methyl-3-propyl-hexyl)-aluminum, tri-ethyl-aluminum, tri-(2-ethyl-3-methyl-butyl)-aluminum, tri-(2-ethyl-3-methyl-pentyl)-aluminum, tri-(2,3-di-ethyl-pentyl-aluminum), tri-n-propyl-aluminum, tri-iso-propyl-aluminum, tri-(2-propyl-3-methyl-buthyl)-aluminum, tri-(2-iso-propyl-3-methyl-buthyl)-aluminum, tri-n-butyl-aluminum, tri-iso-butyl-aluminum (TIBA), tri-cert-butyl-aluminum, tri-(2-iso-butyl-3-methyl-pentyl)-aluminum, tri-(2,3,3-tri-methyl-penthyl)-aluminum, tri-(2,3,3-tri-methyl-hexyl)-aluminum, tri-(2-ethyl-3,3-di-methyl-butyl)-aluminum, tri-(2-ethyl-3,3-di-methyl-penthyl)-aluminum, tri-(2-iso-propyl-3,3-dimethyl-butyl)-aluminum, tri-(2-tri-methylsilyl-propyl)-aluminum, tri-2-methyl-3-phenyl-butyl)-aluminum, tri-(2-ethyl-3-phenyl-butyl)-aluminum, tri-(2,3-di-methyl-3-phenyl-butyl)-aluminum, tri-(2-phenyl-propyl)-aluminum, tri-[2-(4-fluoro-phenyl)-propyl]-aluminum, tri-[2-(4-chloro-phenyl)-propyl]-aluminum, tri-[2-(3-iso-propyl-phenyl-tri-(2-phenyl-butyl)-aluminum, tri-(3-methyl-2-phenyl-butyl)-aluminum, tri-(2-phenyl-pentyl)-aluminum, tri-[2-(penta-fluoro-phenyl)-propyl]-aluminum, tri-(2,2-diphenyl-etyl]-aluminum, tri-[2-phenyl-methyl-propyl]-aluminum, tri-penthyl-aluminum, tri-hexyl-aluminum, tri-cyclohexyl-aluminum, tri-octyl-aluminum, di-ethyl-aluminum hydride, di-n-propyl-aluminum hydride, di-n-butyl-aluminum hydride, di-iso-butyl-aluminum hydride (DIBAH), di-hexyl-aluminum hydride, di-iso-hexyl-aluminum hydride, di-octyl-aluminum hydride, di-iso-octyl-aluminum hydride, ethyl-aluminum di-hydride, n-propyl-aluminum di-hydride, iso-butyl-aluminum di-hydride, di-ethyl-aluminum chloride (DEAC), mono-ethyl-aluminum dichloride (EADC), di-methyl-aluminum chloride, di-iso-butyl-aluminum chloride, iso-butyl-alluminum dichloride, ethylaluminum-sesquichloride (EASC), such as the corresponding compounds wherein one of the hydrocarbon substituents is substituted by an hydrogen atom and those wherein one or two of the hydrocarbon substituents are substituted by a iso-butyl group. Di-ethyl-aluminum chloride (DEAC), mono-ethyl-aluminum dichloride (EADC), ethylaluminumsesquichloride (EASC), are particularly preferred.

Preferably, when used for the formation of a (co)polymerization catalytic system according to the present invention, the aluminum alkyls having general formula (II) can be put into contact with a vanadium bis-imine complex having general formula (I), in proportions such that the molar ratio between the vanadium present in the vanadium bis-imine complex having general formula (I) and the aluminum present in the aluminum alkyls having general formula (II) can be ranging from 5 to 5000, preferably ranging from 10 to 1000. The sequence through which the vanadium bis-imine complex having general formula (I) and the aluminum alkyl having general formula (II) are put into contact from each other is not particularly critical.

Further details related to the aluminum alkyls having general formula (II) can be found in the international patent application WO 2011/061151.

According to a particularly preferred embodiment, said organo-oxygenated compounds ($b_2$) can be selected from the aluminoxanes having general formula (III):

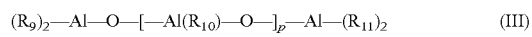

$$(R_9)_2\text{—Al—O—[—Al}(R_{10})\text{—O—}]_p\text{—Al—}(R_{11})_2 \quad \text{(III)}$$

wherein $R_9$, $R_{10}$ and $R_{11}$, equal to or different from each other, represent a hydrogen atom, a halogen atom such as, for example, chlorine, bromine, iodine, fluorine; or they are selected from linear or branched $C_1$-$C_{20}$ alkyl groups, cycloalkyl groups, aryl groups, said groups being optionally substituted by one or more silicon or germanium atoms; and p is an integer ranging from 0 to 1000.

As known, the aluminoxanes are compounds containing Al—O—Al bonds, with a variable ratio O/Al, obtainable according to processes known in the art such as, for example, through the reaction, under controlled conditions, of an alkyl aluminum, or of an alkyl aluminum halide, with water or with other compounds containing predetermined amounts of available water, such as, for example, in the case of the reaction of aluminum trimethyl with aluminum sulphate hexahydrate, copper sulphate pentahydrate, or iron sulfate pentahydrate.

Said aluminoxanes and, in particular, methylaluminoxane (MAO), are compounds obtainable by the known processes of metalorganic chemistry such as, for example, by adding trimethyl aluminum to a suspension in hexane of aluminum sulfate hydrate.

Preferably, when used for the formation of a (co)polymerization catalytic system according to the present invention, the aluminoxanes having general formula (III), can be put into contact with a vanadium bis-imine complex having general formula (I), in proportions such that the molar ratio between the alluminum (Al) present in the aluminoxane having general formula (III) and the vanadium present in the vanadium bis-imine complex having general formula (I) is ranging from 10 to 10000, preferably ranging from 100 to 5000. The sequence through which the vanadium bis-imine complex having general formula (I) and the aluminoxane having general formula (III) are put into contact from each other is not particularly critical.

As well as the above-mentioned preferred aluminoxanes having general formula (III), in the definition of the compound ($b_2$) according to the present invention galoxane are also comprised wherein, in the general formula (III), gallium is present in place of aluminum and stannoxanes wherein, in the general formula (III), tin is present in place of aluminum, whose use as polymerization co-catalysts of olefins in the presence of metallocene complexes is known. Further details related to said galloxanes and stannoxanes can be found, for example, in the american U.S. Pat. Nos. 5,128, 295 and 5,258,475.

Specific examples of aluminoxanes having general formula (III) particularly useful for the aim of the present invention are: methylaluminoxane (MAO), ethylaluminoxane, n-butylaluminoxane, tetra-iso-butylaluminoxane (TIBAO), Cert-butylaluminoxane, tetra-(2,4,4-tri-metyl-penthyl)aluminoxane (TIOAO), tetra-(2,3-di-methylbutyl) aluminoxane (TDMBAO), tetra-(2,3,3-trimetylbuthyl)aluminoxane (TDMBAO). Methylaluminoxane (MAO), as such or in the dry form (MAO-dry) or modified (MAO-modified) are particularly preferred.

Further details related to the aluminoxanes having general formula (III) can be found in the international patent application WO 2011/061151.

According to a preferred embodiment of the present invention, said compounds or mixtures of compounds ($b_3$) can be selected from organic compounds of aluminum and specially of boron, such as, for example, those represented by the following general formulae:

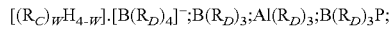

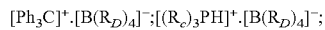

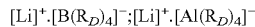

wherein w is an integer ranging from 0 to 3, each group $R_C$ represents, independently, an alkyl group or an aryl group having from 1 to 10 carbon atoms and each group $R_D$ represents, independently, an aryl group partially or totally, preferably totally, fluorinated, having from 6 to 20 carbon atoms, P represents a pyrrole radical optionally substituted.

Preferably, when used for the formation of a (co)polymerization catalytic system according to the present invention, the compounds or mixtures of compounds ($b_3$) can be put into contact with a vanadium bis-imine complex having general formula (I) in proportions such that the molar ratio between the metal (M') present in the compounds or mixtures of compounds ($b_3$) and the vanadium present in the vanadium bis-imine complex having general formula (I) is ranging from 0.1 to 15, preferably ranging from 0.5 to 10, more preferably ranging from 1 to 6. The sequence through which the vanadium bis-imine complex having general formula (I) and the compound/mixture of compounds ($b_3$) are put into contact from each other is not particularly critical.

Said compounds or mixtures of compounds ($b_3$), specially in the case wherein $X_1$, $X_2$ or $X_3$ in the vanadium bis-imine complex having general formula (I) are different from alkyl, must be used in combination with an aluminoxane having general formula (III) such as, for example, methylaluminoxane (MAO), or, preferably, with an aluminum alkyl having general formula (II), more preferably an aluminum trialkyl having from 1 to 8 carbon atoms in each alkyl residue such as, for example, tri-methyl-aluminum, tri-ethyl-aluminum, tri-iso-butylaluminum (TIBA).

Examples of methods generally used for the formation of a (co)polymerization catalytic system according to the present invention, in the case of use of compounds or mixtures of compounds ($b_3$), are qualitatively schematized in the list reported below, which is, however, not to be intended as limitative of the scope of the present invention:

($m_1$) contact of a vanadium bis-imine complex having general formula (I) wherein at least one from $X_1$, $X_2$ or $X_3$ is an alkyl group, with at least one compound or a mixture of compounds ($b_3$) whose cation is capable of reacting with said alkyl group to form a neutral compound, and the ion of which being voluminous, non-coordinating and capable of delocalizing the negative charge;

($m_2$) reaction of a vanadium bis-imine complex having general formula (I) with at least one aluminum alkyl having general formula (II), preferably an aluminum trialkyl, used in molar excess from 10/1 to 300/1, followed by a reaction with a strong Lewis' acid, such as, for example, tris(pentafluorophenyl)boron [compound ($b_3$)], in almost stoichiometric amount or in small excess compared to vanadium (V);

($m_3$) contact and reaction of a vanadium bis-imine complex having general formula (I) with a molar excess from 10/1 to 1000/1, preferably from 100/1 to 500/1 of at least an aluminum trialkyl or an alkylaluminum halide that can be represented with the formula $AlR'_m Z_{3-m}$ wherein R' is a $C_1$-$C_8$ alkyl group, linear or branched, or a mixture thereof, Z is an halogen, preferably chlorine or bromine, and m is a decimal number ranging from 1 to 3, followed by the addition to the composition thus obtained of at least one compound or a mixture of compounds ($b_3$) in amounts such that the ratio between said compound or mixture of compounds ($b_3$) or the aluminum of said compound or mixture of compounds ($b_3$) and the vanadium of the vanadium bis-imine complex having general formula (I) is ranging from 0.1 to 15, preferably from 1 to 6.

Example of compounds or mixtures of compounds ($b_3$) capable of producing a ionic catalytic system by reaction with a vanadium bis-imine complex having general formula (I) according to the present invention are described, although with reference to the formation of ionic metallocene complexes, in the following publications, whose content is herein present as reference:

W. Beck et al., "*Chemical Reviews*" (1988), Vol. 88, pag. 1405-1421;

S. H. Stares, "*Chemical Reviews*" (1993), Vol. 93, pag. 927-942;

European patent applications EP 277 003, EP 495 375, EP 520 732, EP 427 697, EP 421 659, EP 418 044;

published international patent applications WO 92/00333, WO 92/05208.

Specific example of compounds or mixtures of compounds ($b_3$) particularly useful for the aim of the present invention are: tributylammonium-tetrakis-pentafluorophenyl-borate tributylammonium-tetrakis-pentafluorophenyl-aluminate, tributylammonium-tetrakis-[(3,5-di-(trifluorophenyl)]-borate, tributylammonium-tetrakis-(4-fluorophenyl)]-borate, N,N-dimetylbenzylammonium-tetrakis-pentafluoro-phenyl-borate, N,N-dimetyl-hexylammonium-tetrakis-pentafluorophenyl-borate, N,N-dimethylanilinium-tetrakis-(pentafluorophenyl)-borate, N,N-dimethylanilinium-tetrakis-(pentafluorophenyl)-aluminate, di-(propyl)-ammonium-tetrakis-(pentafluorophenyl)-borate, di-(ciclohexyl)-ammonium-tetrakis-(pentafluorophenyl)-borate, tri-phenyl-carbenium-tetrakis-(pentafluorophenyl)-borate, tri-fenilcarbenium-tetrakis-(penta-fluorophenyl)-aluminate, tris(pentafluorophenyl) boron, tris(pentafluorophenyl)-alluminum, or mixtures thereof. The tetrakis-pentafluorophenyl-borates are preferred.

For the aim of the present description and of the following claims, the terms "mole" and "molar ratio" are used both with reference to compounds consisting of molecules, and with reference to atoms and ions, omitting for these latter the terms gram-atom or atomic ratio, even if scientifically more correct.

Other additives or components can be optionally added to the above-mentioned catalytic system so as to adapt it to satisfy in practice specific requirements. The catalytic systems thus obtained are therefore to be considered as comprised in the aim of the present invention. Additives and/or components which can be added in the preparation and/or formulation of the above-mentioned catalytic system are, for example: inert solvents, such as, for example, aliphatic and/or aromatic hydrocarbons; aliphatic and/or aromatic ethers; weakly coordinating additives (for example, Lewis' bases) selected, for example, from non-polymerizable olefins; ethers which are sterically hindered or electronically poor; halogenating agents such as, for example, silicon halides, halogenated hydrocarbons, preferably chlorinated; or mixtures thereof.

Said catalytic system can be prepared, as already reported above, according to methods known in the art.

For example, said catalytic system can be separately prepared (preformed) and subsequently introduced in the (co)polymerization environment. In this regard, said catalytic system, can be prepared by reacting at least one vanadium bis-imine complex having general formula (I) with at least one co-catalyst (b), optionally in the presence of other additives or components selected from those cited above, in the presence of a solvent such as, for example, toluene, heptane, at a temperature ranging from 20° C. to 60° C., for a time ranging from 10 seconds to 10 hours, preferably ranging from 30 seconds to 5 hours.

Alternatively, said catalytic system, can be prepared in situ, namely directly in the (co)polymerization environment. In this regard, said catalytic system can be prepared separately introducing the vanadium bis-imine complex having general formula (I), the co-catalyst (b) and the selected conjugated diene/dienes to be (co)polymerized, operating under conditions at which the (co)polymerization is carried out.

More details related to the preparation of said catalytic system can be found in the examples reported below.

For the aim of the process of the present invention, said catalytic systems can also be supported on inert solids, preferably consisting of silicon and/or aluminum oxides, such as, for example, silica, alumina or silico-aluminates. For supporting said catalytic systems, the known techniques of supporting comprising, generally, the contact, in a suitable inert liquid medium, between the support, optionally activated by heating at temperatures higher than 200° C., and one or both the components, i.e. the vanadium bis-imine complex having general formula (I) and the co-catalyst (b), of the catalytic system object of the present invention, can be used. For the aims of the present invention, it is not necessary that both the components are supported, also only the vanadium bis-imine complex (a) having general formula (I), or the co-catalyst (b) being able to be present on the surface of the support. In this latter case, the component lacking on the surface, is then placed in contact with the component supported, when forming the catalyst active for the polymerization is desired.

The vanadium bis-imine complex having general formula (I), and the catalytic systems based on it, which were supported on a solid by functionalization of this latter and formation of a covalent bond between the solid and the vanadium bis-imine complex having general formula (I), are further comprised within the aim of the present invention.

The amount of the vanadium bis-imine complex having general formula (I) and of the co-catalyst (b) that can be used in the process of the present invention varies depending on the (co)polymerization process desired to be used. Said amount is however such that to obtain a molar ratio between the vanadium (V) present in the vanadium bis-imine complex having general formula (I) and the metal present in the co-catalyst (b), e.g. the aluminum when the co-catalyst (b) is selected from the aluminum alkyls ($b_1$) or from the aluminoxanes ($b_2$), the boron when the co-catalyst (b) is selected from the compounds or mixtures of compounds ($b_3$) having general formula (III), comprised between the values reported above.

According to a preferred embodiment of the present invention, said process can be carried out in the presence of an inert organic solvent selected, for example, from: saturated aliphatic hydrocarbons such as, for example, butane, pentane, hexane, heptane, or mixtures thereof; saturated cyclo-aliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof.

Preferably, said solvent is selected from saturated aliphatic hydrocarbons, aromatic hydrocarbons.

Alternatively, said process can be carried out using as solvent the same conjugated diene(s) which must be (co) polymerized, according to the process known as "bulk process".

According to a preferred embodiment of the present invention, the concentration of the conjugated diene to be (co)polymerized in said inert organic solvent can be ranging from 5% by weight to 50% by weight, preferably ranging from 10% by weight to 20% by weight, with respect to the total weight of the conjugated diene and inert organic solvent mixture.

According to a preferred embodiment of the present invention, said process can be carried out at a temperature ranging from −70° C. to +100° C., preferably ranging from −20° C. to +80° C.

As far as the pressure is concerned, it is preferred to operate at the pressure of the components of the mixture to be (co)polymerized.

The above-mentioned process can be carried out both continuously, and in "batch".

As above-mentioned, said process allows to obtain the preparation of (co)polymers of conjugated dienes, such as, for example, linear or branched polybutadiene or polyisoprene, having a prevalent content of trans-1,4 and cis-1,4 units, i.e. having a content of trans-1,4 and cis-1,4 units 65%, preferably ranging from 70% to 90%.

In order to better understand the present invention and put into practise the same, some illustrative and non-limiting examples are reported below.

EXAMPLES

Reagents and Materials

The reagents and materials used in the following examples of the invention, the optional pretreatments thereof and the manufacturer thereof, are reported in the list below:

vanadium trichloride:tetrahydrofuran complex (1:3) [VCl$_3$(THF)$_3$] (Aldrich): purity degree 97%, used as such;

methylaluminoxane (MAO) (toluene solution 10% by weight) (Crompton): used as such; or in the dry form (MAO-dry) obtained by removing the free trimethylaluminum together with the solvent from the toluene solution under vacuum and drying the residue obtained always under vacuum;

modified methylaluminoxane (MAO-modified) (7% toluene solution) (Akzo Nobel): used as such;

aniline (Aldrich): used after purification by means of distillation;

2 tert-butylaniline (Aldrich): used as such;

2,6-di-iso-propylaniline (Aldrich): used as such;

o-toluidine (Aldrich): used as such;

2,4,6-trimethylaniline (Aldrich): used as such;

methanol (Carlo Erba, RPE): used as such, or optionally anhydrified by distillation on magnesium (Mg);

formic acid (Aldrich): used as such;

2,3-butandione (Aldrich): used as such;

glyoxal (40% aqueous solution) (Aldrich): used as such;

acetic acid (Aldrich): used as such;

pentane (Fluka): purity degree 99%, maintained at reflux on sodium/potassium (Na/K) for about 8 hours, then distilled and stored on molecular sieves under nitrogen;

toluene (Fluka): purity degree >99.5%, maintained under reflux on sodium (Na) for about 8 hours, then distilled and stored on molecular sieves under nitrogen;

1,2-dichlorobenzene (Aldrich): purity degree 99%, maintained at reflux on calcium hydride ($CaH_2$) for about 8 hours, then distilled "trap-to-trap" and maintained in nitrogen atmosphere at 4° C.;

1,3-butadiene (Air Liquide): pure, ≥99.5%, evaporated from the container before of each production, dried by passing through a column packed with molecular sieves and condensed into the reactor which was pre-cooled at −20° C.;

isoprene (Aldrich): pure, ≥99%, maintained at reflux on calcium hydride for 2 hours, then distilled "trap-to-trap" and maintained in nitrogen atmosphere at 4° C.;

fluorhydric acid (HF) (40% aqueous solution) (Aldrich): used as such;

sulfuric acid ($H_2SO_4$) (96% aqueous solution) (Aldrich): used as such, or diluted with distilled water (1/5);

nitric acid ($HNO_3$) (70% aqueous solution) (Aldrich): used as such;

sodium carbonate ($Na_2CO_3$) (Aldrich): used as such;

silver nitrate ($AgNO_3$) (Aldrich): used as such;

tetrachloroethane deuterated ($C_2D_2Cl_4$) (Acros): used as such;

examethyldisiloxane (HMDS) (Acros): used as such.

Analysis and characterization methods, reported below, were used.

Elementary Analysis a) Determination of V

For determining the weight amount of vanadium (V), in the vanadium bis-imine complexes used for the aim of the present invention, an aliquot exactly weighted, operating in dry-box under nitrogen flux, of about 30 mg-50 mg of sample, was placed in a platinum crucible of about 30 ml, together with a mixture of 1 ml of hydrofluoric acid (HF) at 40%, 0.25 ml of sulphuric acid ($H_2SO_4$) at 96% and 1 ml of nitric acid ($HNO_3$) at 70%. The crucible were then heated on a plate increasing the temperature up to the appearance of sulphuric white fumes (about 200° C.). The mixture thus obtained was cooled at room temperature (20° C.-25° C.) additivated with 1 ml of nitric acid ($HNO_3$) at 70% and then brought again to fumes appearance. After having repeated for other two times the sequence, a clear solution, almost without colour, was obtained. Then, 1 ml of nitric acid ($HNO_3$) and about 15 ml of water, were added, in the cold, then heated to 80° C., for about 30 minutes. The sample thus prepared was diluted with pure water MilliQ up to a weight of about 50 g, exactly weighted, to obtain a solution on which the instrumental analytic determination was carried out by a ICP-OES spectrometer (optical detection plasma) Thermo Optek IRIS Advantage Duo, by comparison with solutions having known concentration. For this aim, for each analyte, a calibration line was prepared in the range 0 ppm-10 ppm, measuring solutions with known titer obtained by dilution per weighing of certified solutions.

The solution of the sample prepared as above was further diluted by weighing so as to obtain concentrations close to those of reference, before carrying out the spectrophotometric detection. All the samples were prepared in duplicate. The results were considered acceptable if the single data of the duplicate tests did not differ more than relative 2% with respect to the average value thereof.

b) Determination of Chlorine

About that, the samples of the vanadium bis-imine complexes used for the aim of the present invention, about 30 mg-50 mg, were exactly weighted into 100 ml glass in dry-box under nitrogen flow. 2 g of sodium carbonate ($Na_2CO_3$) were added and, outside the dry-box, ml of MilliQ water were added. Plate-boiling was achieved under magnetic stirring for about 30 minutes. After cooling, 1/5 diluted sulfuric acid ($H_2SO_4$) was added, up to acid reaction and titration with silver nitrate ($AgNO_3$) 0.1 N was carried out by a potenziometric titrator.

c) Determination of Carbon, Hydrogen and Nitrogen

The determination of carbon, hydrogen and nitrogen, in the vanadium bis-imine complexes used for the aim of the present invention, as well as in the ligands used for the aim of the present invention, was carried out by a Carlo Erba Mod. 1106 automated analyzer.

$^{13}$C-HMR and $^1$H-HMR Spectra $^{13}$C-HMR and $^1$H-HMR spectra were registered by a nuclear magnetic resonance spectrometer mod. Bruker Avance 400, using tetrachloroethane deuterated ($C_2D_2Cl_4$) at 103° C., and hexamethyldisiloxane (HMDS) as internal standard. For this aim, polymer solution having concentrations equal to 10% by weight with respect to the total weight of the polymer solution were used.

The microstructure of the polymers [i.e. content of cis-1, 4(%) units] was determined through the analysis of the above-mentioned spectra according to what reported in literature by Mochel, V. D., in "Journal of Polymer Science Part A-1: Polymer Chemistry" (1972), Vol. 10, Issue 4, pag. 1009-1018.

Spectra FT-IR (Solid State, UATR)

The FT-IR spectra (solid state, UATR) were registered by Bruker IFS 48 spectrophotometer equipped with an horizontal ATR linkage Thermo Spectra-Tech. The section, wherein the samples to be analyzed are placed, is a Fresnel ATR accessory (Shelton, Conn., USA) which uses crystals of zirconium selenide (ZnSe) with an angle of incidence of 45° in the horizontal direction.

The FT-IR spectra (solid state, UATR) of the used vanadium bis-imine complexes object of the present invention, were obtained by inserting samples of the vanadium bis-imine complex to be analyzed in said section.

IR Spectra

The IR (FT-IR) spectra were registered by Thermo Nicolet Nexus 670 and Bruker IFS 48 spectrophotometers.

The I.R. spectra (FT-IR) of the ligands used in the present invention, were obtained by dispersing the ligand to be analyzed in potassium bromide (KBr) anhydrous (KBr discs), or in nujol suspension.

The IR (FT-IR) spectra of the polymers, were obtained from polymer films on tablets of potassium bromide (KBr), said films being obtained by deposition of a solution in hot 1,2-dichlorobenzene of the polymer to be analyzed. The concentration of the polymer analyzed solutions was equal to 10% by weight with respect to the total weight of the polymer solution.

Determination of the Molecular Weight

The determination of the molecular weight (MW) of the polymers obtained was carried out by GPC ("Gel Permeation Chromatography") by operating under the following conditions:

Agilent 1100 pump;
detector I.R. Agilent 1100;
PL Mixed-A columns;
solvent/eluent: tetrahydrofuran (THF);
flow: 1 ml/min;
temperature: 25° C.;
calculation of the molecular mass: Universal Calibration method.

The weight average molecular weight ($M_w$) and the Polydispersion Index (PDI) corresponding to the $M_w/M_n$ ($M_n$=number average molecular weight) ratio are reported.

Example 1

Synthesis of the Ligand Having Formula (L1)

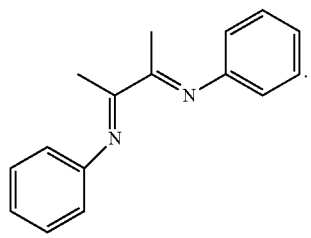

(L1)

A solution of aniline (9.3 g-100 mmol) in methanol (80 ml), a solution of 2,3-butandione (4.3 g-50 mmol) in methanol (20 ml) and some drops of formic acid were loaded, consecutively and under stirring, into a reactor of 500 ml equipped with a magnetic stirrer. The obtained yellow solution was left, under stirring, at room temperature, for about 2 hours, up to obtain the precipitation of a yellow solid product. The whole was left at rest for 14 hours and, then, said solid product was recovered by filtration and dried, under vacuum, at room temperature, obtaining 11.6 g of a yellowish solid product (yield=98%) having formula (L1).

FT-IR (nujol): 1633 cm$^{-1}$ $v_{(C=N)}$.
Molecular weight (MW): 236.32.
Elementary analysis [found (calculated for $C_{16}H_{16}N_2$)]: C: 81.42% (81.32%); H: 6.33% (6.82%); N: 11.92% (11.85%).

Example 2

Synthesis of the Ligand Having Formula (L2)

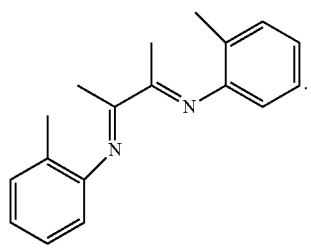

(L2)

A solution of o-toluidina (9.6 g-90 mmol) in methanol (50 ml), a solution of 2.3-butandione (3.875 g-45 mmol) in methanol (30 ml) and some drops of formic acid were loaded, consecutively and under stirring, into a reactor of 500 ml equipped with a magnetic stirrer. The obtained yellow solution was left, under stirring, at room temperature, for about 2 hours, up to obtain the precipitation of a yellow solid product. The whole was left at rest for 14 hours and, then, said solid product was recovered by filtration and dried, under vacuum, at room temperature, obtaining 9.7 g of a yellowish solid product (yield=81%) having formula (L2).

FT-IR (nujol): 1637 cm$^{-1}$ $v_{(C=N)}$.
Molecular weight (MW): 264.37.
Elementary analysis [found (calculated for $C_{18}H_{20}N_2$)]: C: 81.75% (81.78%); H: 7.65% (7.63%); N: 10.58% (10.60%).

Example 3

Synthesis of the Ligand Having Formula (L3)

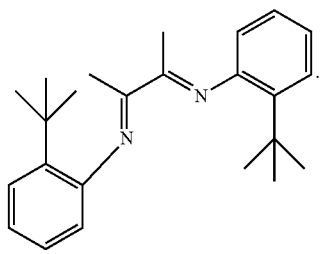

(L3)

A solution of 2 tert-butylaniline (13.43 g-90 mmol) in methanol (50 ml) and some drops of formic acid, were loaded, consecutively and under stirring, into a reactor of 500 ml equipped with a magnetic stirrer, and then a solution of 2,3-butandione (3.875 g-45 mmol) in 30 ml of methanol was added dropwise under stirring. The obtained yellow solution was left, under stirring, at room temperature, for about 2 hours, up to obtain the precipitation of a yellow solid product. The whole was left at rest for 14 hours and, then, said solid product was recovered by filtration and dried, under vacuum, at room temperature, obtaining 14.1 g of a yellowish solid product (yield=90%) having formula (L3).

FT-IR (nujol): 1638 cm$^{-1}$ $v_{(C=N)}$.
Molecular weight (MW): 348.53.
Elementary analysis [found (calculated for $C_{24}H_{32}N_2$)]: C: 81.95% (82.71%); H: 9.26% (9.25%); N: 8.02% (8.04%).

Example 4

Synthesis of the Ligand Having Formula (L4)

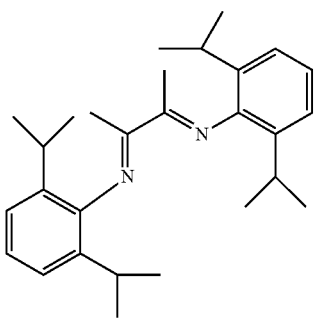
(L4)

A solution of 2,6-di-iso-propylaniline (15.96 g-90 mmol) in methanol (80 ml) and some drops of formic acid, were loaded, consecutively and under stirring, into a reactor of 500 ml equipped with a magnetic stirrer, and then a solution of 2,3-butandione (3.875 g-45 mmol) in methanol (80 ml) was added dropwise under stirring. The obtained yellow solution was left, under stirring, at room temperature, for about 2 hours, up to obtain the precipitation of a yellow solid product. The whole was left at rest for 14 hours and, then, said solid product was recovered by filtration and dried, under vacuum, at room temperature, obtaining 15.4 g of a yellowish solid product (yield=84%) having formula (L4).

FT-IR (nujol): 1640 cm$^{-1}$ $v_{(C=N)}$.
Molecular weight (MW): 404.64.
Elementary analysis [found (calculated for $C_{28}H_{40}N_2$)]: C: 82.86% (83.11%); H: 9.97% (9.96%); N: 6.94% (8.92%).

Example 5

Synthesis of the Ligand Having Formula (L5)

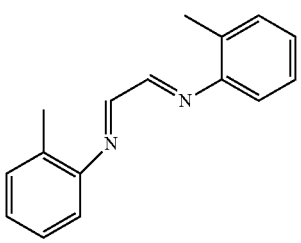
(L5)

A solution of glyoxal (14.51 g-100 mmol) (aqueous solution 40% by weight), further diluted with methanol (80 ml) and distilled water (8 ml), and after cooling at 0° C. by a water/ice bath, a solution of o-toluidine (21.43 g-200 mmol) in methanol (25 ml), were loaded, consecutively and under stirring, into a reactor of 500 ml equipped with a magnetic stirrer. The obtained yellow solution was left, under stirring, at room temperature, for about 30 minutes, up to obtain the precipitation of a yellow solid product. Said solid product was recovered by filtration, washed with methanol, recrystallized from methanol and dried, under vacuum, at room temperature, obtaining 23 g of a microcrystalline yellowish solid product (yield=97%) having formula (L5).

FT-IR (nujol): 1605 cm$^{-1}$ $v_{(C=N)}$.
Molecular weight (MW): 236.26.
Elementary analysis [found (calculated for $C_{16}H_{16}N_2$)]: C: 81.42% (81.32%); H: 6.80% (6.82%); N: 12.00% (11.85%).

Example 6

Synthesis of the Ligand Having Formula (L6)

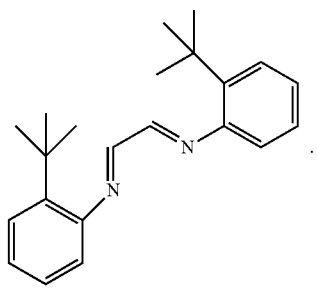
(L6)

2 tert-butylaniline (14.924 g-100 mmol) dissolved in a mixture of methanol and distilled water (50 ml+100 ml) and, after cooling at 0° C. by a water/ice bath, a solution of glyoxal (7.26 g-50 mmol) (aqueous solution at 40% by weight), were loaded, consecutively and under stirring, into a reactor of 500 ml equipped with a magnetic stirrer. The obtained yellow solution was left, under stirring, at room temperature, for about 30 minutes, up to obtain the precipitation of a yellow solid product. Said solid product was recovered by filtration, washed with methanol, recrystallized from pentane and dried, under vacuum, at room temperature, obtaining 12 g of a microcrystalline yellowish solid product (yield=75%) having formula (L6).

FT-IR (nujol): 1608 cm$^{-1}$ $v_{(C=N)}$.
Molecular weight (MW): 320.48.
Elementary analysis [found (calculated for $C_{22}H_{28}N_2$)]: C: 82.42% (82.45%); H: 8.80% (8.81%); N: 8.76% (8.74%).

Example 7

Synthesis of the Ligand Having Formula (L7)

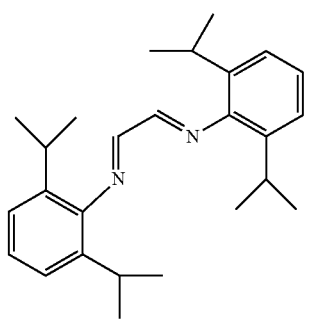
(L7)

A solution of 2,6-di-iso-propylaniline (17.73 g-100 mmol) in methanol (25 ml), some drops of acetic acid and, after heating at 50° C., a solution of glyoxal (7.26 g-50 mmol) (aqueous solution at 40% by weight) in methanol (25 ml), were loaded, consecutively and under stirring, into a reactor of 500 ml equipped with a magnetic stirrer. The obtained yellow solution was left, under stirring, at 50° C., for 15 minutes, and then at room temperature for 24 hours, up to obtain the precipitation of a yellow solid product. Said solid product was recovered by filtration, washed with methanol, recrystallized from pentane and dried, under vacuum, at room temperature, obtaining 16.8 g of a microcrystalline yellowish solid product (yield=90%) having formula (L7).

FT-IR (nujol): 1608 cm$^{-1}$ $\nu_{(C=N)}$.

Molecular weight (MW): 376.59.

Elementary analysis [found (calculated for $C_{26}H_{36}N_2$)]: C: 82.91% (82.93%); H: 9.80% (9.64%); N: 7.70% (7.74%).

Example 8

Synthesis of the Ligand Having Formula (L8)

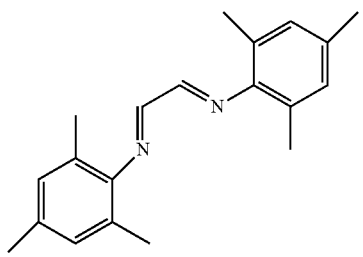

(L8)

2,4,6-trimethylaniline (13.52 g-100 mmol) dissolved in a mixture of methanol and distilled water (50 ml+100 ml) and, after cooling at 0° C. with a bath of water/ice, a solution of glyoxal (7.26 g-50 mmol) (40% by weight aqueous solution) were loaded, consecutively and under stirring, into a reactor of 500 ml equipped with a magnetic stirrer. The obtained yellow solution was left, under stirring, at room temperature, for about 2 hours, up to obtain the precipitation of a yellow solid product. Said solid product was recovered by filtration, washed with methanol, recrystallized from pentane and dried, under vacuum, at room temperature, obtaining 12 g of a microcrystalline yellowish solid product (yield=82%) having formula (L8).

FT-IR (nujol): 1616 cm$^{-1}$ $\nu_{(C=N)}$.

Molecular weight (MW): 292.42.

Elementary analysis [found (calculated for $C_{20}H_{24}N_2$)]: C: 82.00% (82.15%); H: 8.28% (8.27%); N: 9.50% (9.58%).

Example 9

Synthesis of the VCl$_3$(L1) (THF) Complex [Sample BIB1]

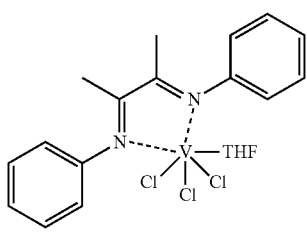

(BIB1)

A bright yellow toluene solution (20 ml) of the ligand having formula (L1) (0.68 g; 2.88 mmol; molar ratio L1/V=1), obtained as described in Example 1, was added dropwise into a tailed flask of 100 ml, to a suspension of vanadium(III)chloride(tris-tetrahydrofuran) [VCl$_3$(THF)$_3$] (1.08 g; 2.89 mmol) in toluene (15 ml). The whole was left to react, at room temperature, overnight thus obtaining a first portion of dark red crystals which were separated by filtration and then dried, under vacuum, at room temperature. The solution obtained after filtration, was concentrated under vacuum and, then, pentane was added (40 ml): the whole was left at rest at room temperature, overnight, thus obtaining a second portion of dark red crystals, which were separated by filtration and then dried, under vacuum, at room temperature. On the whole, 0.92 g (yield=68.0%) of a dark red crystalline solid product corresponding to the VCl$_3$(L1) (THF) complex were obtained.

Elementary analysis [found (calculated for $C_{20}H_{24}Cl_3N_2OV$)]: C: 51.70% (51.58%); H: 5.45% (5.19%); Cl: 23.00% (22.84%); N: 6.10% (6.02%); V: 10.80% (10.94%).

Molecular weight (MW): 465.72.

FT-IR ($\nu_{(max)}$–cm$^{-1}$): 3057 m, 3051 m 2982 br, 1592 s, 1486 s, 1451 m, 1419 w, 1380 m, 1237 s, 1140 w, 1072 w, 1015 m.

Example 10

Synthesis of the VCl$_3$(L2) (THF) Complex [Sample IP56]

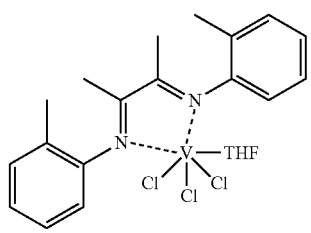

(IP56)

A yellow toluene solution (20 ml) of the ligand having formula (L2) (0.613 g; 2.32 mmol; molar ratio L2/V=1), obtained as described in Example 2, in toluene (20 ml) was added dropwise into a tailed flask of 100 ml, to a suspension of vanadium(III)chloride(tris-tetrahydrofuran) [VCl$_3$(THF)$_3$] (0.867 g; 2.32 mmol) in toluene (15 ml): the whole was left to react, at room temperature, overnight. Then, pentane was added (50 ml) thus obtaining a suspension which was filtered: the residue remained on the filter was dried, under vacuum, at room temperature, thus obtaining a brown powder 0.807 g (yield=71.1%) corresponding to the VCl$_2$(L2) (THF) complex.

Elementary analysis [found (calculated for $C_{22}H_{28}Cl_3N_2OV$)]: C: 53.65% (53.51%); H: 5.85% (5.72%); Cl: 21.45% (21.54%); N: 5.80% (5.67%); V: 10.40% (10.32%).

Molecular weight (MW): 493.77.

In FIG. 1 the FT-IR spectrum of the obtained VCl$_3$(L2) (THF) complex ("Absorbance"; "Wavenumber") is reported.

Example 11

Synthesis of the VCl₃(L3) Complex [IP61 Sample]

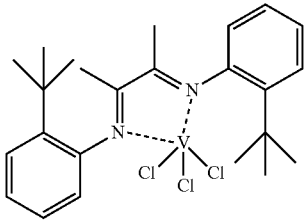

(IP61)

A yellow toluene solution (15 ml) of the ligand having formula (L3) (0.523 g; 1.5 mmol; molar ratio L3/V=1), obtained as described in Example 3, was added dropwise into a tailed flask of 100 ml, to a suspension of vanadium (III)chloride(tris-tetrahydrofuran) [VCl₃(THF)₃] (0.560 g; 1.5 mmol) in toluene (10 ml): the whole was left to react, at room temperature, overnight. Then, pentane was added (40 ml) thus obtaining a suspension which was filtered: the residue remained on the filter was dried, under vacuum, at room temperature, thus obtaining a light brown powder 0.489 g (yield=64.5%) corresponding to the VCl₃(L3) complex.

Elementary analysis [found (calculated for $C_{28}H_{32}Cl_3N_2V$)]: C: 56.86% (56.99%); H: 6.10% (6.38%); Cl: 21.20% (21.03%); N: 5.35% (5.54%); V: 10.30% (10.07%).

Molecular weight (MW): 505.82.

Figure 2:
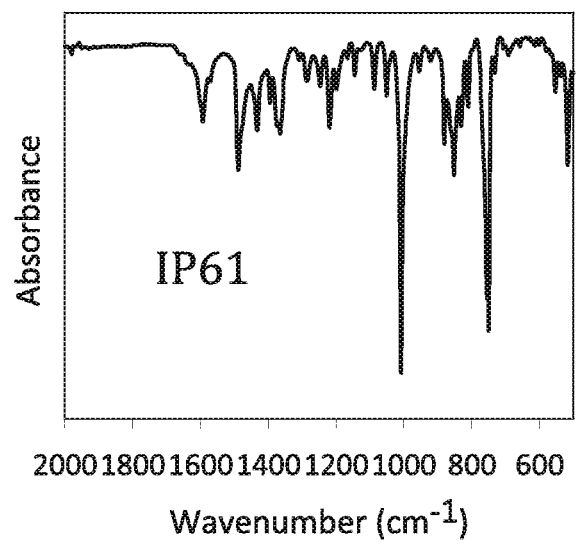

In FIG. 2 the FT-IR spectrum of the obtained VCl₃(L3) complex ("Absorbance"; "Wavenumber") is reported.

Example 12

Synthesis of the VCl₃(L4) Complex [GL1403 Sample]

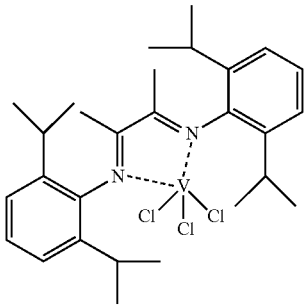

(GL1403)

A yellow/brown toluene solution (30 ml) of the ligand having formula (L4) (1.69 g; 4.18 mmol; molar ratio L4/V=1,1), obtained as described in Example 4, was added dropwise into a tailed flask of 100 ml, to a suspension of vanadium(III)chloride(tris-tetrahydrofuran) [VCl₃(THF)₃] (1.42 g; 3.80 mmol) in toluene (60 ml): the whole was left to react, at room temperature, overnight. Then, the obtained solution was concentrated by evaporation, under vacuum, at about 20 ml, then pentane (70 ml) was added and the whole was left at −20° C., overnight. The obtained suspension was filtered: the residue remained on the filter was dried, under vacuum, at room temperature, thus obtaining a brown microcrystalline powder 1,66 g (yield=78%) corresponding to the VCl₃(L4)complex.

Elementary analysis [found (calculated for $C_{28}H_{40}Cl_3N_2V$)]: C: 59.70% (59.85%); H: 7.10% (7.17%); Cl: 19.20% (18.93%); N: 5.15% (4.99%); V: 9.20% (9.07%).

Molecular weight (MW): 561.93.

Example 13

Synthesis of the VCl₃(L5) (THF) Complex [IP55 Sample]

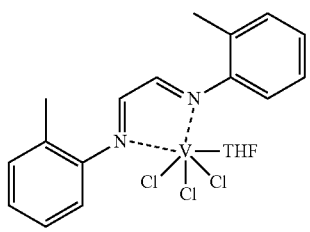

(IP55)

A yellow toluene solution (15 ml) of the ligand having formula (L5) (0.583 g; 2.47 mmol; molar ratio L5/V=1), obtained as described in Example 5, was added dropwise into a tailed flask of 100 ml, to a suspension of vanadium (III)chloride(tris-tetrahydrofuran) [VCl₃(THF)₃] (0.906 g; 2.42 mmol) in toluene (15 ml): the whole was left to react, at room temperature, overnight. Then, pentane was added (30 ml) thus obtaining a suspension which was filter: the residue remained on the filter was dried, under vacuum, at room temperature, thus obtaining a dark brown powder 0.604 g (yield=53.6%) corresponding to the VCl₃(L5) (THF) complex.

Elementary analysis [found (calculated for $C_{20}H_{24}Cl_3N_2V$)]: C: 51.54% (51.58%); H: 5.40% (5.19%); Cl: 23.05% (22.84%); N: 6.18% (6.02%); V: 10.80% (10.94%).

Molecular weight (MW): 465.72.

Figure 3:
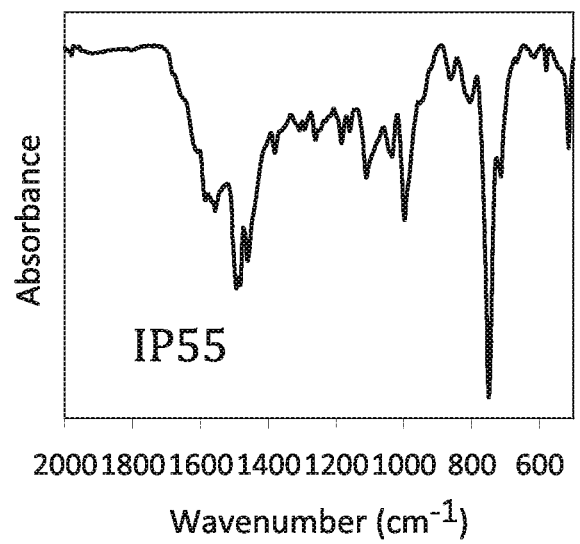

In FIG. 3 the FT-IR spectrum of the obtained VCl₃(L5) (THF) complex ("Absorbance"; "Wavenumber") is reported.

Example 14

Synthesis of the VCl₃(L6) Complex [IP62 Sample]

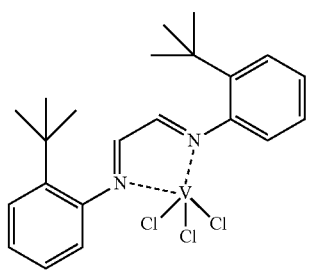

(IP62)

A yellow toluene solution (20 ml) of the ligand having formula (L6) (0.839 g; 2.6 mmol; molar ratio L6/V=1), obtained as described in Example 6, was added dropwise into a tailed flask of 100 ml, to a suspension of vanadium (III)chloride(tris-tetrahydrofuran) [VCl$_3$(THF)$_3$] (0.964 g; 2.6 mmol) in toluene (15 ml): the whole was left to react, at room temperature, overnight. Then, pentane was added (50 ml) thus obtaining a suspension which was filtered: the residue remained on the filter was dried, under vacuum, thus obtaining a dark violet powder 0.864 g (yield=70.4%) corresponding to the VCl$_3$(L6) complex.

Elementary analysis [found (calculated for C$_{22}$H$_{28}$Cl$_3$N$_2$OV)]: C: 54.95% (55.31%); H: 6.08% (5.91%); Cl: 22.70% (22.26%); N: 5.76% (5.86%); V: 10.60% (10.66%).

Molecular weight (MW): 477.77.

Figure 4:
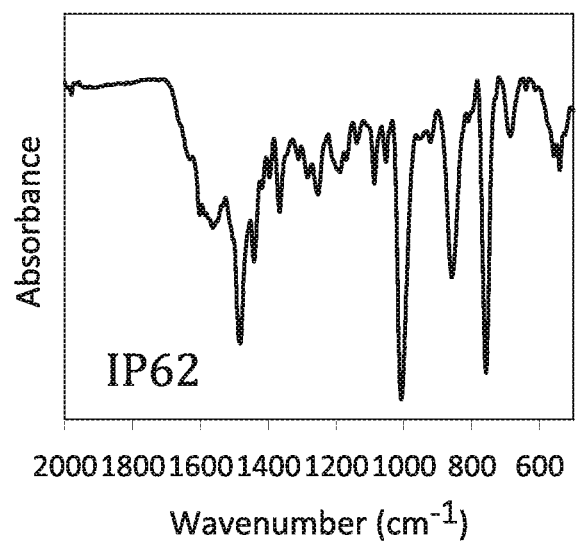

In FIG. 4 the FT-IR spectrum of the obtained VCl$_3$(L6) complex ("Absorbance"; "Wavenumber") is reported.

Example 15

Synthesis of the VCl$_3$(L7) Complex [BIB2 Sample]

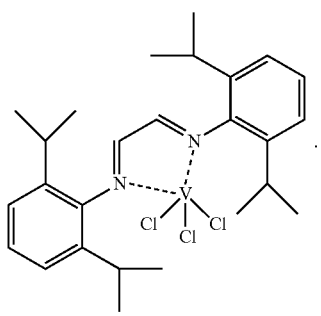

(BIB2)

A yellow toluene solution (15 ml) of the ligand having formula (L7) (0.79 g; 2.09 mmol; molar ratio L7/V=1), obtained as described in Example 7, was added dropwise into a tailed flask of 100 ml, to a suspension of vanadium (III)chloride(tris-tetrahydrofuran) [VCl$_3$(THF)$_3$] (0.78 g; 2.09 mmol) in toluene (10 ml): the whole was left to react, at room temperature, overnight. Then, the obtained solution was concentrated, by evaporation, under vacuum, to about 10 ml, then pentane (50 ml) was added and the whole was left at −20° C., overnight. The obtained suspension was filtered: the residue remained on the filter was dried, under vacuum, at room temperature, thus obtaining 0.66 g (yield=59%) of a brown powder corresponding to the VCl$_3$(L7) complex.

Elementary analysis [found (measured for C$_{26}$H$_{36}$Cl$_3$N$_2$V)]: C: 59.00% (58.49%); H: 6.90% (6.80%); Cl: 20.10% (19.92%); N: 5.10% (5.25%); V: 9.40% (9.54%).

Molecular weight (MW): 533.88.

FT-IR (ν$_{(max)}$–cm$^{-1}$): 2972 s, 2926 m, 2875 m, 1580 v, 1490 m, 1461 m, 1384 w, 1364 w, 1333 w, 1174 w, 1097 m, 1056 m, 1041 m, 1010 m.

Example 16

Synthesis of the VCl$_3$(L8) Complex [Sample IP68]

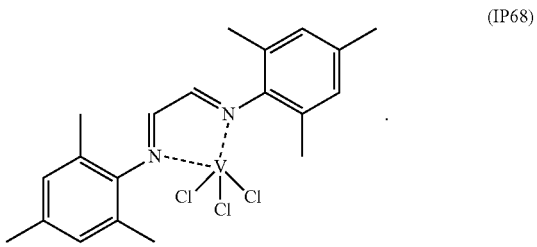

(IP68)

A yellow toluene solution (20 ml) of the ligand having formula (L8) (0.680 g; 2.33 mmol; molar ratio L8/V=1,1), obtained as described in Example 8, was added dropwise into a tailed flask of 100 ml, to a suspension of vanadium (III)chloride(tris-tetrahydrofuran) [VCl$_3$(THF)$_3$] (0.779 g; 2.09 mmol) in toluene (15 ml): the whole was left to react, at room temperature, overnight. Then, pentane (50 ml) was added thus obtaining a suspension which was filtered: the residue remained on the filter was dried, under vacuum, at room temperature, thus obtaining 0.890 g (yield=95%) of a dark brown/violet powder corresponding to the VCl$_3$(L8) complex.

Elementary analysis [found (calculated for C$_{20}$H$_{24}$Cl$_3$N$_2$V)]: C: 53.20% (53.41%); H: 5.25% (5.38%); Cl: 23.55% (23.65%); N: 6.25% (6.23%); V: 11.40% (11.33%).

Molecular weight (MW): 449.72.

Figure 5:
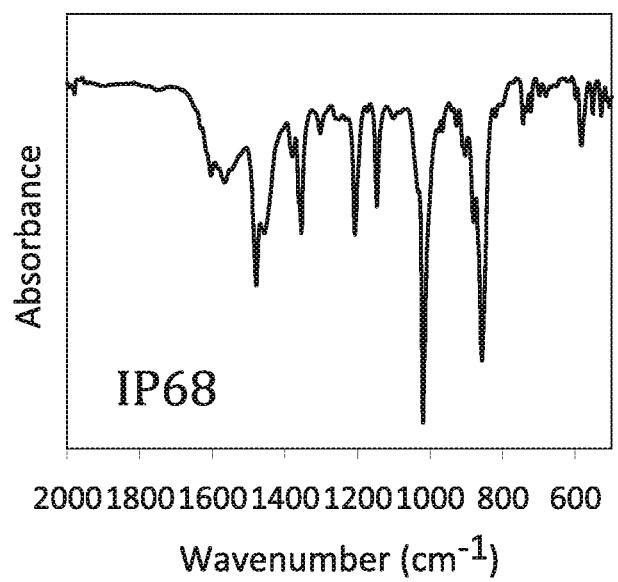

In FIG. 5 the FT-IR spectrum of the obtained VCl$_3$(L8) complex ("Absorbance"; "Wavenumber") is reported.

Example 17 (GR1)

2 ml of 1,3-butadiene equal to about 1.4 g were cold condensed (−20° C.) in a test tube of 25 ml. Then, 7.37 ml of toluene were added and the temperature of the solution thus obtained was brought to 20° C. Then, methylaluminoxane (MAO) in toluene solution (6.3 ml; 1.0×10$^{-2}$ moles, equal to about 0.58 g) was added and, then, the VCl$_3$(L1) (THF) complex (sample BIB1) (2.33 ml of toluene suspension at a concentration equal to 2 mg/ml; 1×10$^{-5}$ moles, equal to about 4.66 mg) obtained as described in Example 9. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.215 g of polybutadiene having a cis-1,4/trans-1,4/1,2 mixed structure having a content of trans-1,4 and cis-1,4 units equal to 85.5%): further characteristics of the process and of the polybutadiene obtained are reported in Table 1.

Figure 6:
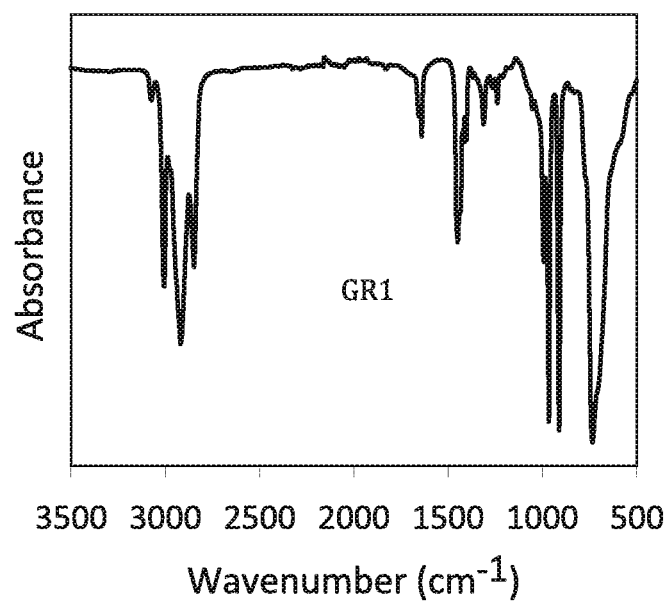

In FIG. 6 the FT-IR spectrum of the polybutadiene obtained ("Absorbance"; "Wavenumber") is reported.

Example 18 (GR2)

2 ml of 1,3-butadiene equal to about 1.4 g were cold condensed (−20° C.) in a test tube of 25 ml. Then, 7.37 ml of toluene were added and the temperature of the solution thus obtained was brought to 20° C. Then, methylaluminoxane-dry (MAO-dry) in toluene solution (6.3 ml; 1.0×10$^{-2}$ moles, equal to about 0.58 g) was added and, then, the VCl$_3$(L1) (THF) complex (sample BIB1) (2.33 ml of toluene suspension at a concentration equal to 2 mg/ml; 1×10$^{-5}$ moles, equal to about 4.66 mg) obtained as described in Example 9. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.328 g of polybutadiene having a cis-1,4/trans-1,4/1,2 mixed structure having a content of trans-1,4 and cis-1,4 units equal to 85.7%): further characteristics of the process and of the polybutadiene obtained are reported in Table 1.

Figure 7:
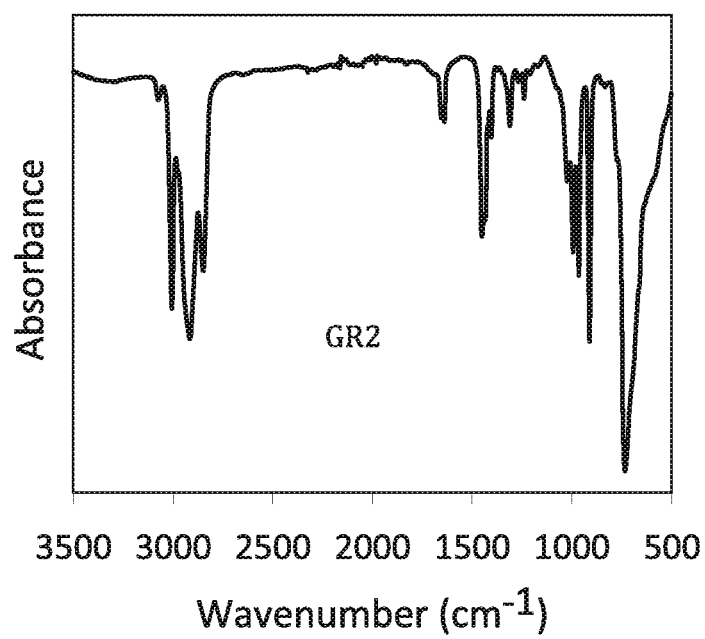

In FIG. 7 the FT-IR spectrum of the polybutadiene obtained ("Absorbance"; "Wavenumber") is reported.

Example 19 (IP58)

2 ml of 1,3-butadiene equal to about 1.4 g were cold condensed (−20° C.) in a test tube of 25 ml. Then, 7.23 ml of toluene were added and the temperature of the solution thus obtained was brought to 20° C. Then, methylaluminoxane (MAO) in toluene solution (6.3 ml; 1.0×10$^{-2}$ moles, equal to about 0.58 g) was added and, then, the VCl$_3$(L2) (THF) complex (sample IP56) (2.47 ml of toluene suspension at a concentration equal to 2 mg/ml; 1×10$^{-5}$ moles, equal to about 4.94 mg) obtained as described in Example 10. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.171 g of polybutadiene having a cis-1,4/trans-1,4/1,2 mixed structure having a content of trans-1,4 and cis-1,4 units equal to 85.9%): further characteristics of the process and of the polybutadiene obtained are reported in Table 1.

Figure 8:
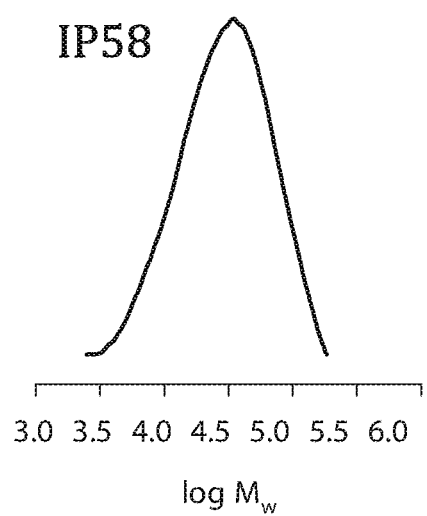

In FIG. 8 the GPC curve ("Gel Permeation Chromatography") of the obtained polybutadiene is reported.

Example 20 (Gr3)

2 ml of 1,3-butadiene equal to about 1.4 g were cold condensed (−20° C.) in a test tube of 25 ml. Then, 7.23 ml of toluene were added and the temperature of the solution thus obtained was brought to 20° C. Then, methylaluminoxane (MAO) in toluene solution (6.3 ml; 1.0×10$^{-2}$ moles, equal to about 0.58 g) was added and, then, the VCl$_3$(L2) (THF) complex (sample IP56) (2.47 ml of toluene suspension at a concentration equal to 2 mg/ml; 1×10$^{-5}$ moles, equal to about 4.94 mg) obtained as described in Example 10. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.256 g of polybutadiene having a cis-1,4/trans-1,4/1,2 mixed structure having a content of trans-1,4 and cis-1,4 units equal to 86.5%): further characteristics of the process and of the polybutadiene obtained are reported in Table 1.

Figure 9:
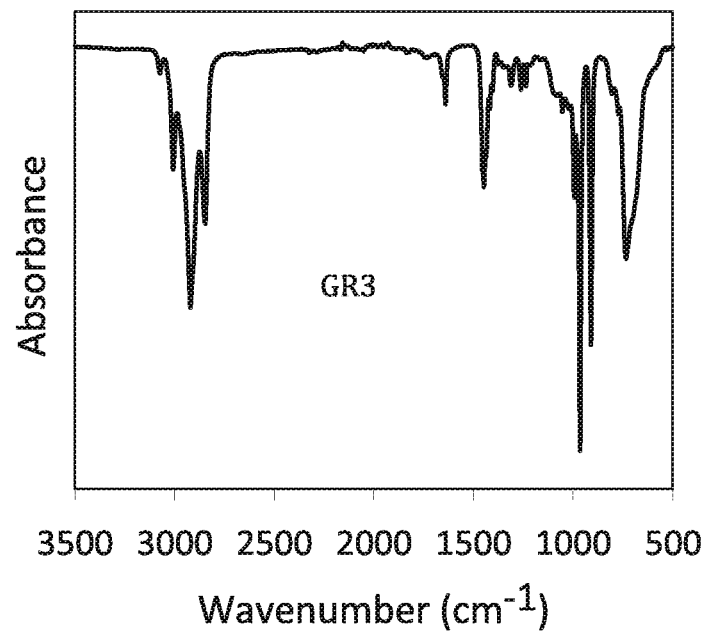

In FIG. 9 the FT-IR spectrum of the polybutadiene obtained ("Absorbance"; "Wavenumber") is reported.

Example 21 (IP63)

2 ml of 1,3-butadiene equal to about 1.4 g were cold condensed (−20° C.) in a test tube of 25 ml. Then, 6.81 ml of toluene were added and the temperature of the solution thus obtained was brought to 20° C. Then, methylaluminoxane (MAO) in toluene solution (6.3 ml; 1.0×10$^{-2}$ moles, equal to about 0.58 g) was added and, then, the VCl$_3$(L3) complex (sample IP61) (2.89 ml of toluene suspension at a concentration equal to 2 mg/ml; 1×10$^{-5}$ moles, equal to about 5.78 mg) obtained as described in Example 11. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.299 g of polybutadiene having a cis-1,4/trans-1,4/1,2 mixed structure having a content of trans-1,4 and cis-1,4 units equal to 85.7%): further characteristics of the process and of the polybutadiene obtained are reported in Table 1.

Figure 10:
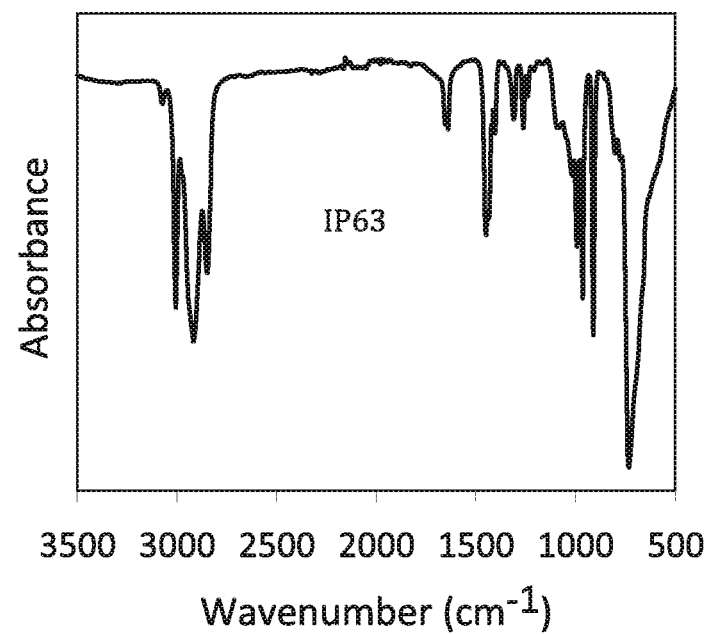

In FIG. 10 the FT-IR spectrum of the polybutadiene obtained ("Absorbance"; "Wavenumber") is reported.

Figure 11:
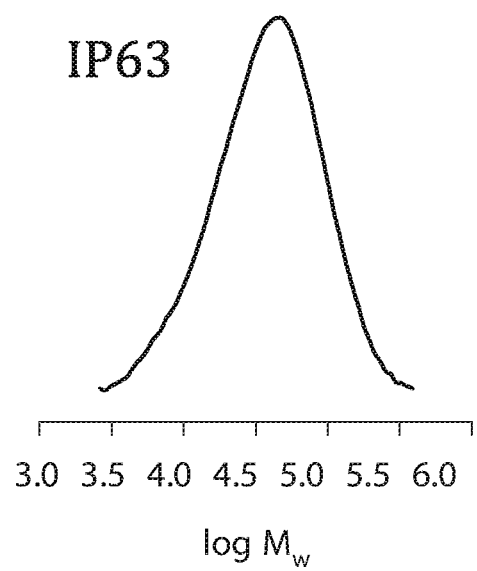

In FIG. 11 the GPC curve ("Gel Permeation Chromatography") of the obtained polybutadiene is reported.

Example 22 (GR4)

2 ml of 1,3-butadiene equal to about 1.4 g were cold condensed (−20° C.) in a test tube of 25 ml. Then, 7.23 ml of toluene were added and the temperature of the solution thus obtained was brought to 20° C. Then, methylaluminoxane-dry (MAO-dry) in toluene solution (6.3 ml; 1.0×10$^{-2}$ moles, equal to about 0.58 g) was added and, then, the VCl$_3$(L3) complex (sample IP61) (2.89 ml of toluene suspension at a concentration equal to 2 mg/ml; 1×10$^{-5}$ moles, equal to about 5.78 mg) obtained as described in Example 11. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.385 g of polybutadiene having a cis-1,4/trans-1,4/1,2 mixed structure having a content of trans-1,4 and cis-1,4 units equal to 84.2%): further characteristics of the process and of the polybutadiene obtained are reported in Table 1.

Example 23 (GR5)

2 ml of 1,3-butadiene equal to about 1.4 g were cold condensed (−20° C.) in a test tube of 25 ml. Then, 6.90 ml of toluene were added and the temperature of the solution thus obtained was brought to 20° C. Then, methylaluminoxane (MAO) in toluene solution (6.3 ml; 1.0×10$^{-2}$ moles, equal to about 0.58 g) was added and, then, the VCl$_3$(L4) complex (sample GL1403) (2.8 ml of toluene suspension at a concentration equal to 2 mg/ml; 1×10$^{-5}$ moles, equal to about 5.6 mg) obtained as described in Example 12. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.442 g of polybutadiene having a cis-1,4/trans-1,4/1,2 mixed structure having a content of trans-1,4 and cis-1,4 units equal to 82%): further characteristics of the process and of the polybutadiene obtained are reported in Table 1.

Example 24 (MP450)

2 ml of 1,3-butadiene equal to about 1.4 g were cold condensed (−20° C.) in a test tube of 25 ml. Then, 6.9 ml of toluene were added and the temperature of the solution thus obtained was brought to 20° C. Then, methylaluminoxane-dry (MAO-dry) in toluene solution (6.3 ml; 1.0×10$^{-2}$ moles, equal to about 0.58 g) was added and, then, the VCl$_3$(L4) complex (sample GL1403) (2.8 ml of toluene suspension at a concentration equal to 2 mg/ml; 1×10$^{-5}$ moles, equal to about 5.6 mg) obtained as described in Example 12. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.515 g of polybutadiene having a cis-1,4/trans-1,4/1,2 mixed structure having a content of trans-1,4 and cis-1,4 units equal to 81.7%: further characteristics of the process and of the polybutadiene obtained are reported in Table 1.

Figure 12:
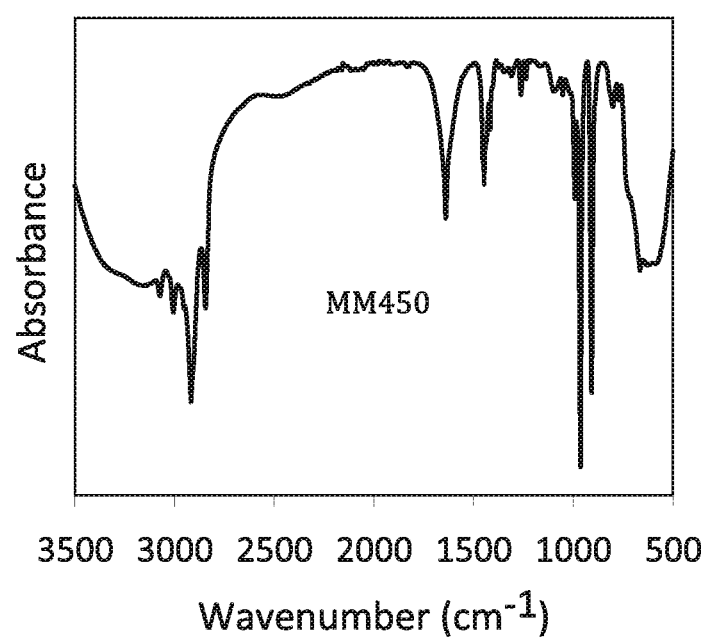

In FIG. 12 the FT-IR spectrum of the polybutadiene obtained ("Absorbance"; "Wavenumber") is reported.

Example 25 (IP57)

2 ml of 1,3-butadiene equal to about 1.4 g were cold condensed (−20° C.) in a test tube of 25 ml. Then, 7.37 ml of toluene were added and the temperature of the solution thus obtained was brought to 20° C. Then, methylaluminoxane (MAO) in toluene solution (6.3 ml; 1.0×10$^{-2}$ moles, equal to about 0.58 g) was added and, then, the VCl$_3$(L5) (THF) complex (sample IP55) (2.33 ml of toluene suspension at a concentration equal to 2 mg/ml; 1×10$^{-5}$ moles, equal to about 4.66 mg) obtained as described in Example 13. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.709 g of polybutadiene having a cis-1,4/trans-1,4/1,2 mixed structure having a content of trans-1,4 and cis-1,4 units equal to 80.4%: further characteristics of the process and of the polybutadiene obtained are reported in Table 1.

Figure 13:
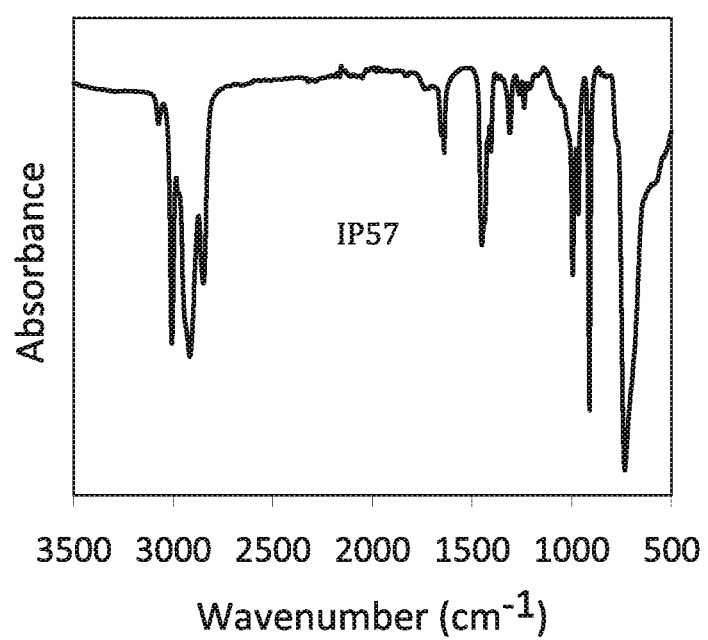

In FIG. 13 the FT-IR spectrum of the polybutadiene obtained ("Absorbance"; "Wavenumber") is reported.

Figure 14:
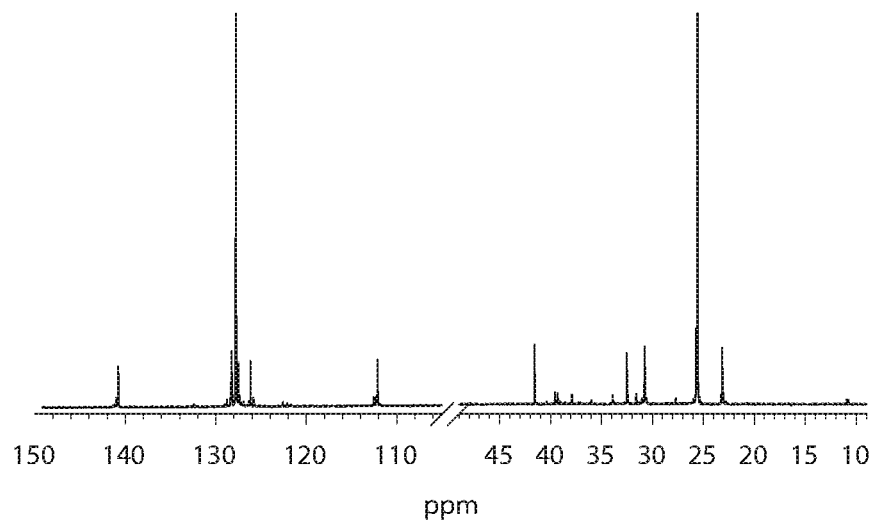
Figure 14:
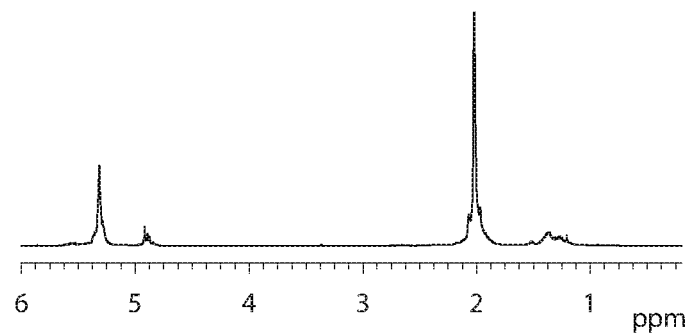

In FIG. 14 the $^1$H-NMR (below) and $^{13}$C-NMR (above) spectra of the obtained polybutadiene are reported.

Example 26 (IP78)

2 ml of 1,3-butadiene equal to about 1.4 g were cold condensed (−20° C.) in a test tube of 25 ml. Then, 7.4 ml of toluene were added and the temperature of the solution thus obtained was brought to 20° C. Then, methylaluminoxane-dry (MAO-dry) in toluene solution (6.3 ml; 1.0×10$^{-2}$ moles, equal to about 0.58 g) was added and, then, the VCl$_3$(L5) (THF) complex (sample IP55) (2.3 ml of toluene suspension at a concentration equal to 2 mg/ml; 1×10$^{-5}$ moles, equal to about 4.66 mg) obtained as described in Example 13. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 1.020 g of polybutadiene having a cis-1,4/trans-1,4/1,2 mixed structure having a content of trans-1,4 and cis-1,4 units equal to 77.2%: further characteristics of the process and of the polybutadiene obtained are reported in Table 1.

Figure 15:
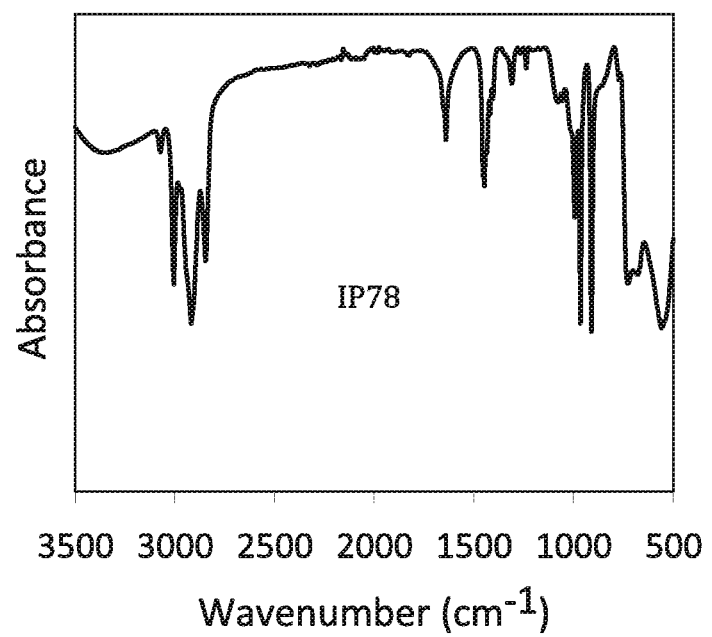

In FIG. 15 the FT-IR spectrum of the polybutadiene obtained ("Absorbance"; "Wavenumber") is reported.

Figure 16:
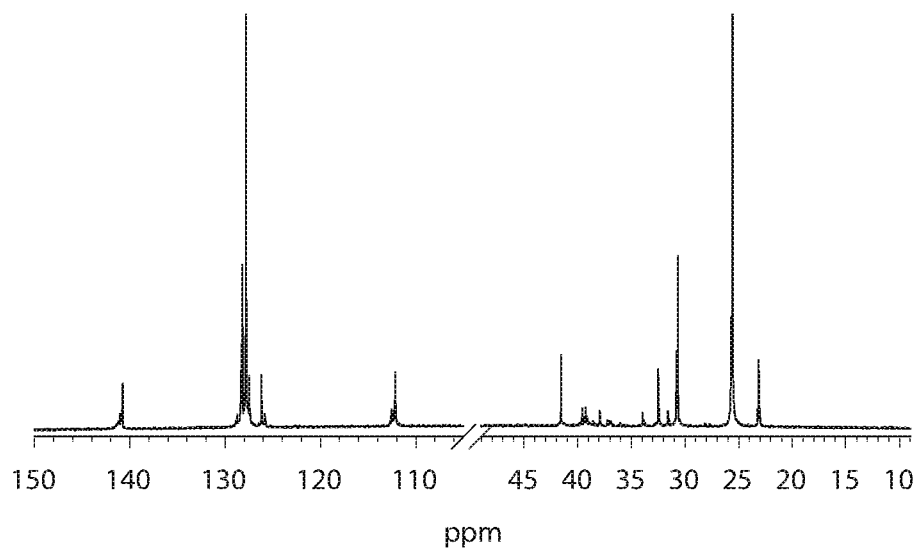
Figure 16:
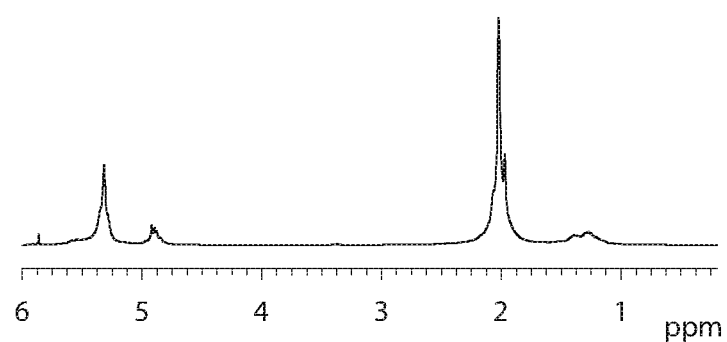

In FIG. 16 the $^1$H-NMR (below) and $^{13}$C-NMR (above) spectra of the obtained polybutadiene are reported.

Example 27 (IP59)

2 ml of 1,3-butadiene equal to about 1.4 g were cold condensed (−20° C.) in a test tube of 25 ml. Then, 8.37 ml of toluene were added and the temperature of the solution thus obtained was brought to 20° C. Then, methylaluminoxane modified (MAO-modified) in toluene solution (5.3 ml; 1.0×10$^{-2}$ moles, equal to about 0.58 g) was added and, then, the VCl$_3$(L5) (THF) complex (sample IP55) (2.33 ml of toluene suspension at a concentration equal to 2 mg/ml; 1×10$^{-5}$ moles, equal to about 4.66 mg) obtained as described in Example 13. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.951 g of polybutadiene having a cis-1,4/trans-1,4/1,2 mixed structure having a content of trans-1,4 and cis-1,4 units equal to 72.1%: further characteristics of the process and of the polybutadiene obtained are reported in Table 1.

Figure 17:
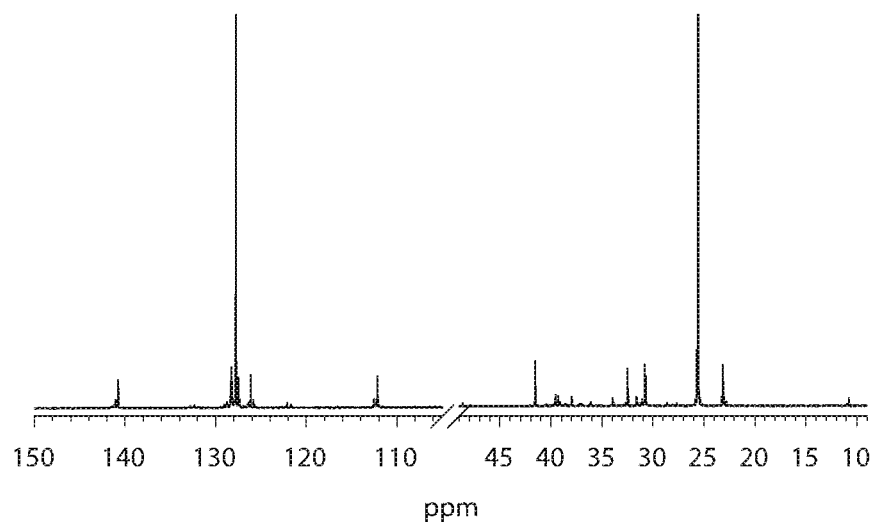
Figure 17:
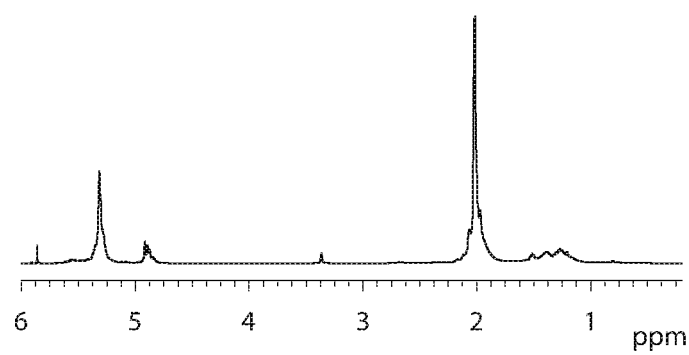

In FIG. 17 the $^1$H-NMR (below) and $^{13}$C-NMR (above) spectra of the obtained polybutadiene are reported.

Example 28 (IP64)

2 ml of 1,3-butadiene equal to about 1.4 g were cold condensed (−20° C.) in a test tube of 25 ml. Then, 6.95 ml of toluene were added and the temperature of the solution thus obtained was brought to 20° C. Then, methylaluminoxane (MAO) in toluene solution (6.3 ml; 1.0×10$^{-2}$ moles, equal to about 0.58 g) was added and, then, the VCl$_3$(L6) complex (sample IP62) (2.75 ml of toluene suspension at a concentration equal to 2 mg/ml; 1×10$^{-5}$ moles, equal to about 5.5 mg) obtained as described in Example 14. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.157 g of polybutadiene having a cis-1,4/trans-1,4/1,2 mixed structure having a content of trans-1,4 and cis-1,4 units equal to 82.2%: further characteristics of the process and of the polybutadiene obtained are reported in Table 1.

Figure 18:
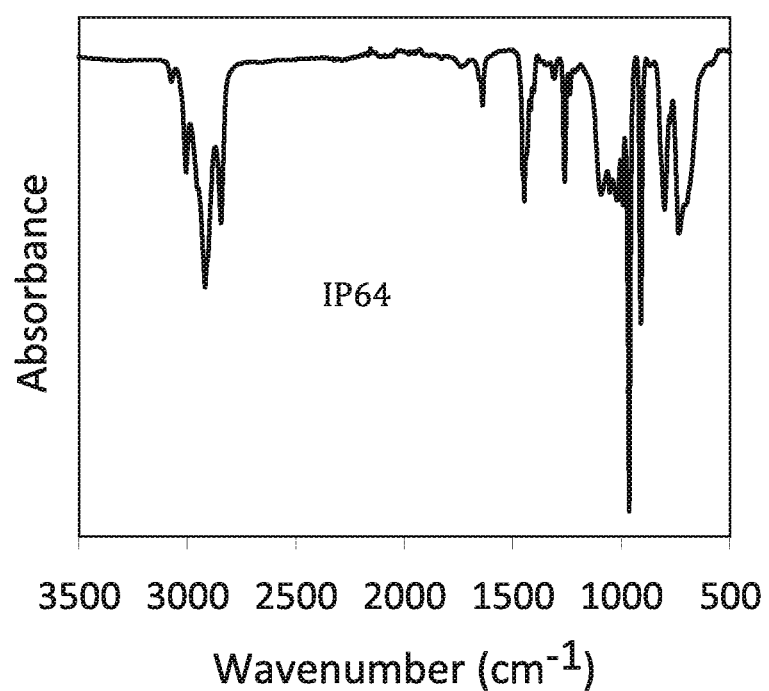

In FIG. 18 the FT-IR spectrum of the polybutadiene obtained ("Absorbance"; "Wavenumber") is reported.

Figure 19:
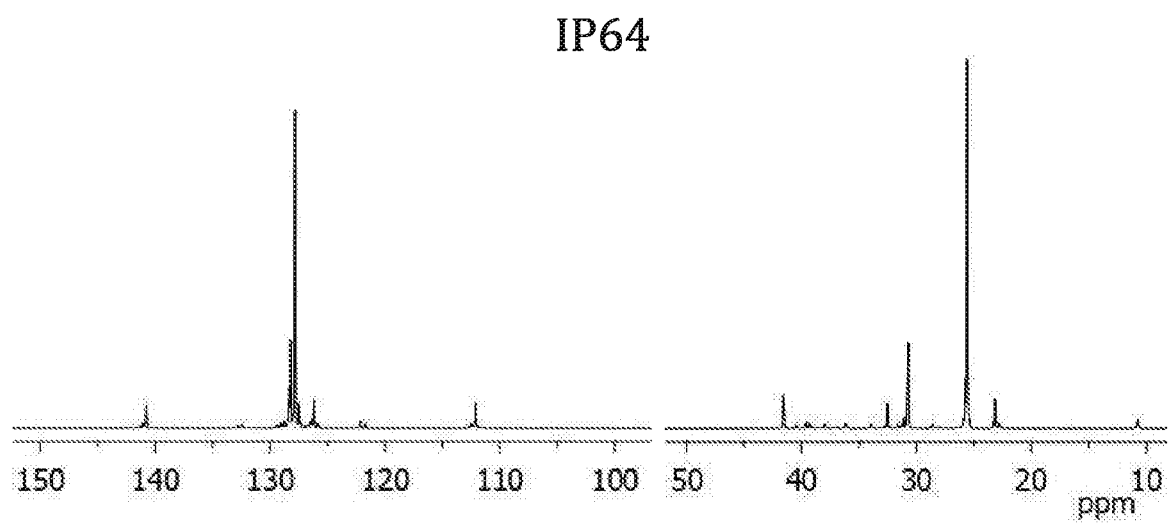
Figure 19:
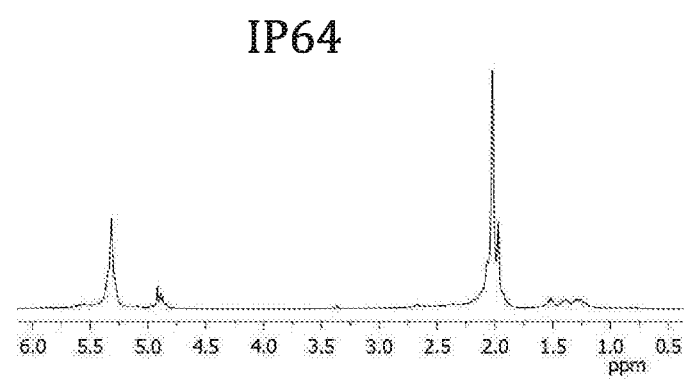

In FIG. 19 the $^1$H-NMR (below) and $^{13}$C-NMR (above) spectra of the obtained polybutadiene are reported.

Example 29 (GR6)

2 ml of 1,3-butadiene equal to about 1.4 g were cold condensed (−20° C.) in a test tube of 25 ml. Then, 6.95 ml of toluene were added and the temperature of the solution thus obtained was brought to 20° C. Then, methylaluminoxane-dry (MAO-dry) in toluene solution (6.3 ml; 1.0×10$^{-2}$ moles, equal to about 0.58 g) was added and, then, the VCl$_3$(L6) complex (sample IP62) (2.75 ml of toluene suspension at a concentration equal to 2 mg/ml; 1×10$^{-5}$ moles, equal to about 5.5 mg) obtained as described in Example 14. The whole was maintained, under magnetic stirring, at 20°

C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.378 g of polybutadiene having a cis-1,4/trans-1,4/1,2 mixed structure having a content of trans-1,4 and cis-1,4 units equal to 76.6%: further characteristics of the process and of the polybutadiene obtained are reported in Table 1.

Figure 20:
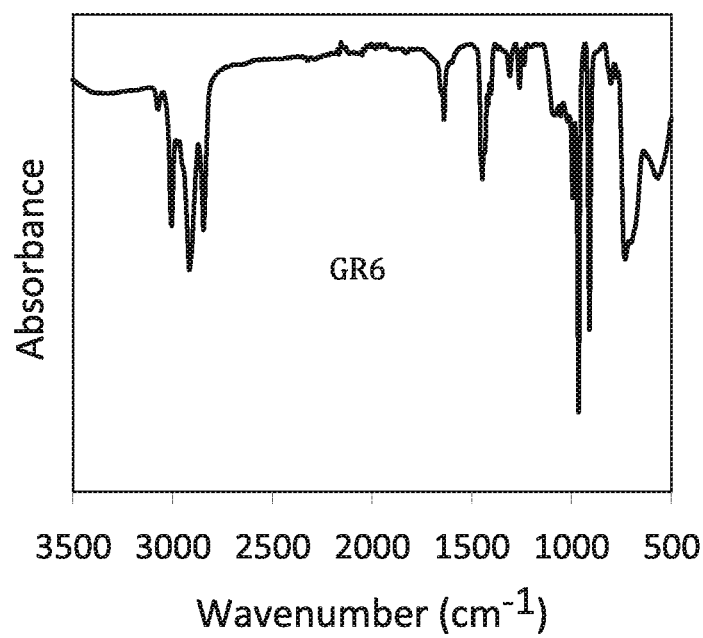

In FIG. 20 the FT-IR spectrum of the polybutadiene obtained ("Absorbance"; "Wavenumber") is reported.

Example 30 (IP30)

2 ml of 1,3-butadiene equal to about 1.4 g were cold condensed (−20° C.) in a test tube of 25 ml. Then, 7.37 ml of toluene were added and the temperature of the solution thus obtained was brought to 20° C. Then, methylaluminoxane modified (MAO-modified) in toluene solution (5.3 ml; $1.0 \times 10^{-2}$ moles, equal to about 0.58 g) was added and, then, the VCl$_3$(L6) complex (sample IP62) (2.4 ml of toluene suspension at a concentration equal to 2 mg/ml; $1 \times 10^{-5}$ moles, equal to about 4.8 mg) obtained as described in Example 14. The whole was maintained, under magnetic stirring, at 20° C., for 70 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.836 g of polybutadiene having a cis-1,4/trans-1,4/1,2 mixed structure having a content of trans-1,4 and cis-1,4 units equal to 76%: further characteristics of the process and of the polybutadiene obtained are reported in Table 1.

Example 31 (GR7)

Figure 21:
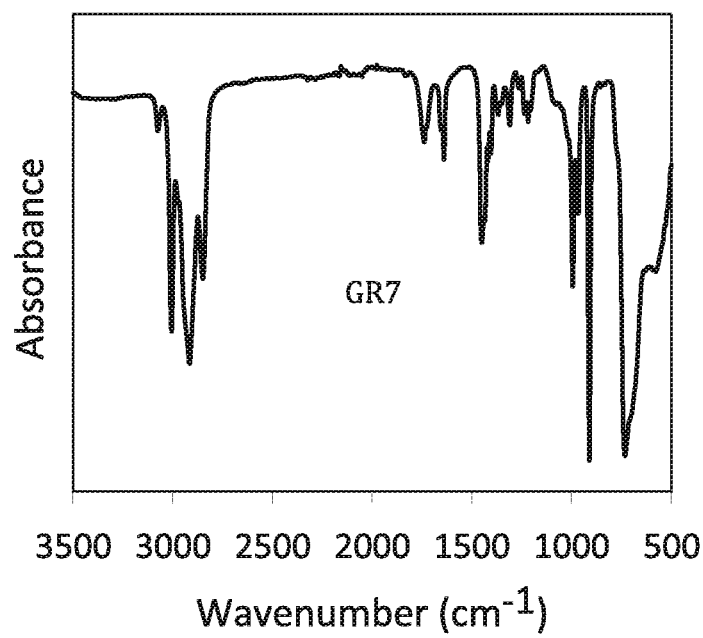

2 ml of 1,3-butadiene equal to about 1.4 g were cold condensed (−20° C.) in a test tube of 25 ml. Then, 7.03 ml of toluene were added and the temperature of the solution thus obtained was brought to 20° C. Then, methylaluminoxane (MAO) in toluene solution (6.3 ml; $1.0 \times 10^{-2}$ moles, equal to about 0.58 g) was added and, then, the VCl$_3$(L7) complex (sample BIB2) (2.67 ml of toluene suspension at a concentration equal to 2 mg/ml; $1 \times 10^{-5}$ moles, equal to about 5.34 mg) obtained as described in Example 15. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.669 g of polybutadiene having a cis-1,4/trans-1,4/1,2 mixed structure having a content of trans-1,4 and cis-1,4 units equal to 77.9%: further characteristics of the process and of the polybutadiene obtained are reported in Table 1. In FIG. 21 the FT-IR spectrum of the polybutadiene obtained ("Absorbance"; "Wavenumber") is reported.

Example 32 (GR8)

2 ml of 1,3-butadiene equal to about 1.4 g were cold condensed (−20° C.) in a test tube of 25 ml. Then, 7.03 ml of toluene were added and the temperature of the solution thus obtained was brought to 20° C. Then, methylaluminoxane-dry (MAO-dry) in toluene solution (6.3 ml; $1.0 \times 10^{-2}$ moles, equal to about 0.58 g) was added and, then, the VCl$_3$(L7) complex (sample BIB2) (2.67 ml of toluene suspension at a concentration equal to 2 mg/ml; $1 \times 10^{-5}$ moles, equal to about 5.34 mg) obtained as described in Example 15. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.669 g of polybutadiene having a cis-1,4/trans-1,4/1,2 mixed structure having a content of trans-1,4 and cis-1,4 units equal to 87.2%: further characteristics of the process and of the polybutadiene obtained are reported in Table 1.

Figure 22:
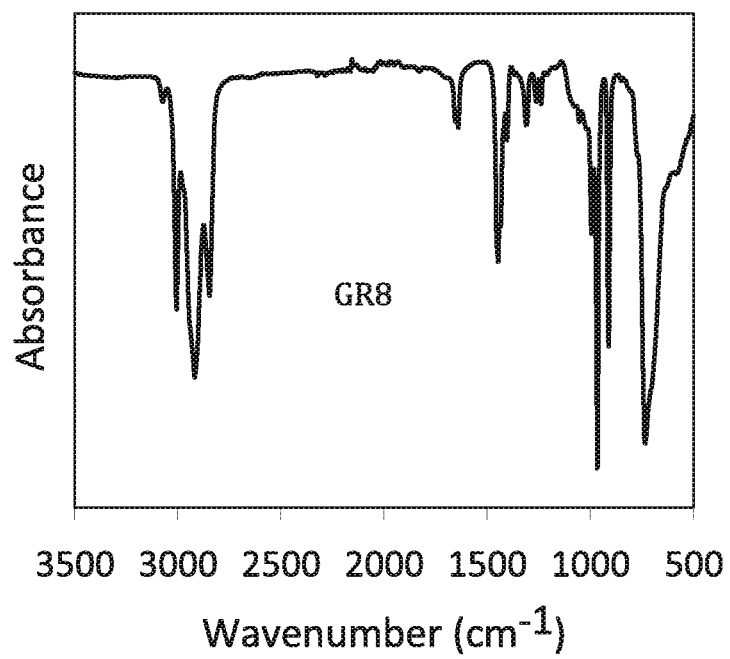

In FIG. 22 the FT-IR spectrum of the polybutadiene obtained ("Absorbance"; "Wavenumber") is reported.

Example 33 (IP71)

Figure 23:
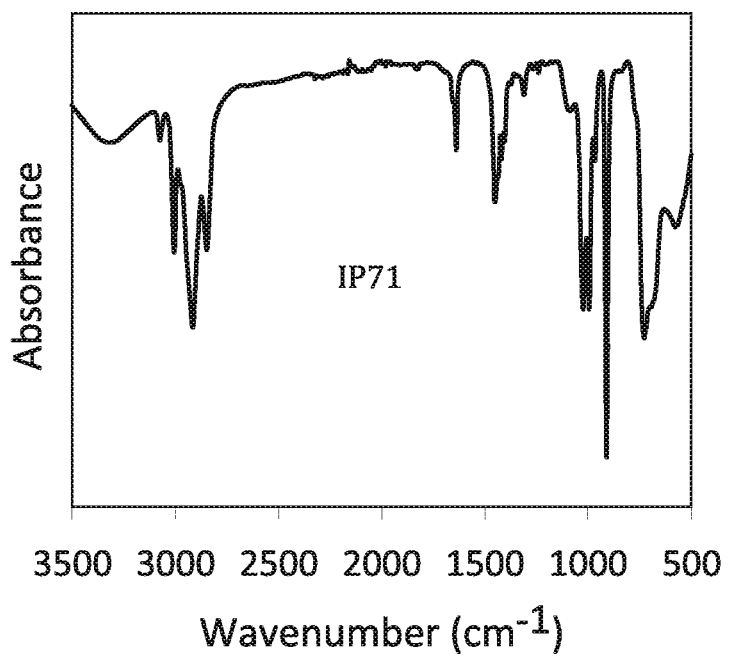

2 ml of 1,3-butadiene equal to about 1.4 g were cold condensed (−20° C.) in a test tube of 25 ml. Then, 7.09 ml of toluene were added and the temperature of the solution thus obtained was brought to 20° C. Then, methylaluminoxane (MAO) in toluene solution (6.3 ml; $1.0 \times 10^{-2}$ moles, equal to about 0.58 g) was added and, then, the VCl$_3$(L8) complex (sample IP68) (2.61 ml of toluene suspension at a concentration equal to 2 mg/ml; $1 \times 10^{-5}$ moles, equal to about 5.22 mg) obtained as described in Example 16. The whole was maintained, under magnetic stirring, at 20° C., for 5 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.321 g of polybutadiene having a cis-1,4/trans-1,4/1,2 mixed structure having a content of trans-1,4 and cis-1,4 units equal to 70%: further characteristics of the process and of the polybutadiene obtained are reported in Table 1. In FIG. 23 the FT-IR spectrum of the polybutadiene obtained ("Absorbance"; "Wavenumber") is reported.

Example 34 (IP69)

2 ml of 1,3-butadiene equal to about 1.4 g were cold condensed (−20° C.) in a test tube of 25 ml. Then, 7.09 ml of toluene were added and the temperature of the solution thus obtained was brought to 20° C. Then, methylaluminoxane-dry (MAO-dry) in toluene solution (6.3 ml; $1.0 \times 10^{-2}$ moles, equal to about 0.58 g) was added and, then, the VCl$_3$(L8) complex (sample IP68) (2.61 ml of toluene suspension at a concentration equal to 2 mg/ml; $1 \times 10^{-5}$ moles, equal to about 5.22 mg) obtained as described in Example 16. The whole was maintained, under magnetic stirring, at 20° C., for 3 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 1.2 g of polybutadiene having a cis-1,4/trans-1,4/1,2 mixed structure having a content of trans-1,4 and cis-1,4 units equal to 71.6%: further characteristics of the process and of the polybutadiene obtained are reported in Table 1.

Figure 24:
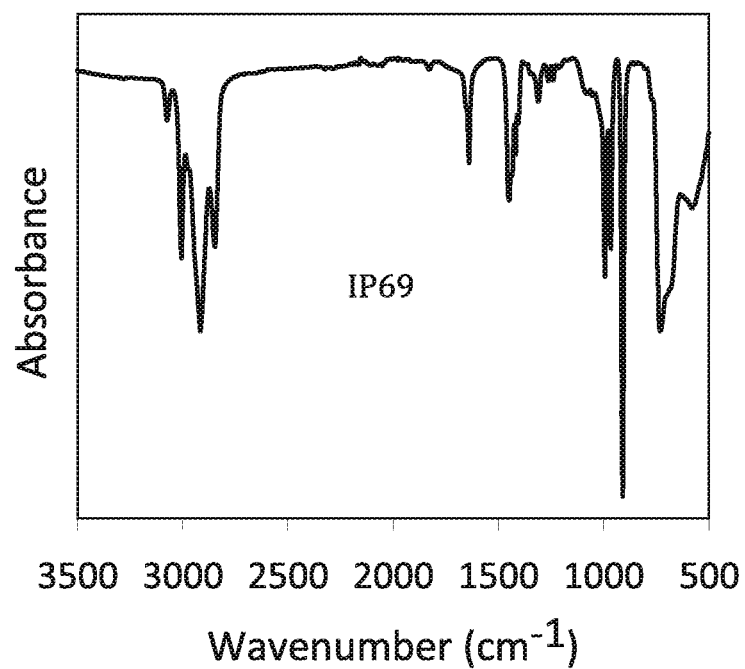
Figure 25:
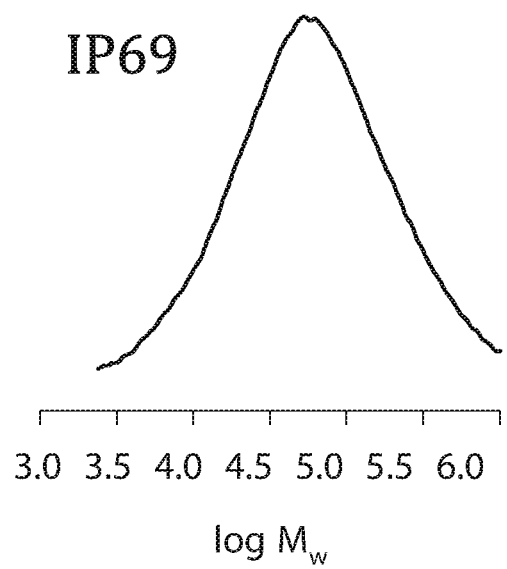

In FIG. 24 the FT-IR spectrum of the polybutadiene obtained ("Absorbance"; "Wavenumber") is reported. In FIG. 25 the GPC curve ("Gel Permeation Chromatography") of the obtained polybutadiene is reported.

Example 35 (IP70)

2 ml of 1,3-butadiene equal to about 1.4 g were cold condensed (−20° C.) in a test tube of 25 ml. Then, 8.09 ml of toluene were added and the temperature of the solution thus obtained was brought to 20° C. Then, methylaluminoxane-modified (MAO-modified) in toluene solution (6.3 ml; $1.0 \times 10^{-2}$ moles, equal to about 0.58 g) was added and, then, the $VCl_3(L8)$ complex (sample IP68) (2.61 ml of toluene suspension at a concentration equal to 2 mg/ml; $1 \times 10^{-5}$ moles, equal to about 5.22 mg) obtained as described in Example 16. The whole was maintained, under magnetic stirring, at 20° C., for 24 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.132 g of polybutadiene having a cis-1,4/trans-1,4/1,2 mixed structure having a content of trans-1,4 and cis-1,4 units equal to 72.4%: further characteristics of the process and of the polybutadiene obtained are reported in Table 1.

Example 36 (MP451)

2 ml of isoprene equal to about 1.34 g were introduced in a test tube of 25 ml. Then, 6.9 ml of toluene were added and the temperature of the solution thus obtained was brought to 20° C. Then, methylaluminoxane-dry (MAO-dry) in toluene solution (6.3 ml; $1.0 \times 10^{-2}$ moles, equal to about 0.58 g) was added and, then, the $VCl_3(L4)$ complex (sample GL1403) (2.8 ml of toluene suspension at a concentration equal to 2 mg/ml; $1 \times 10^{-5}$ moles, equal to about 5.6 mg) obtained as described in Example 12. The whole was maintained, under magnetic stirring, at 20° C., for 21 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.257 g of polyisoprene having a cis-1,4/trans-1,4/3,4 mixed structure having a content of trans-1,4 and cis-1,4 units equal to 84.6%: further characteristics of the process and of the polyisoprene obtained are reported in Table 2.

Figure 26:
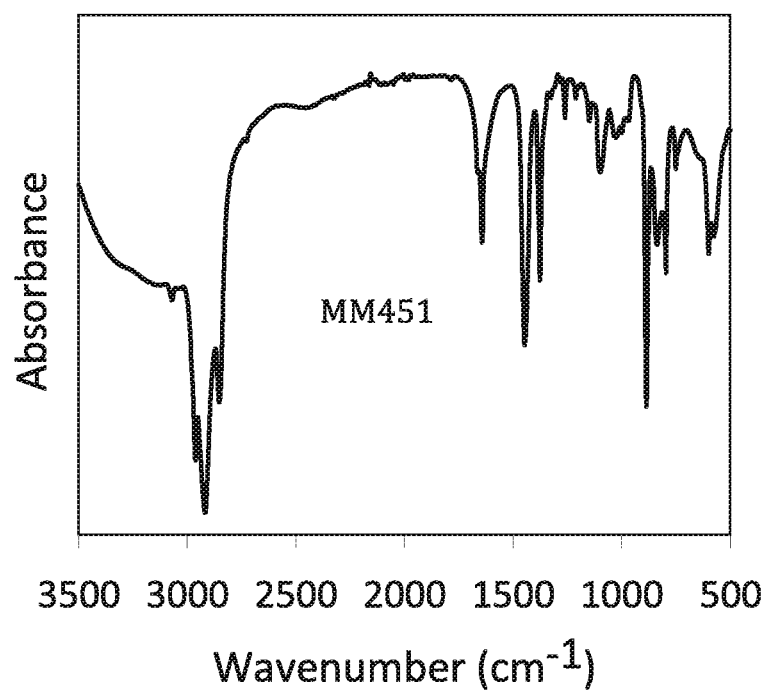

In FIG. 26 the FT-IR spectrum of the polyisoprene obtained ("Absorbance"; "Wavenumber") is reported.

Figure 27:
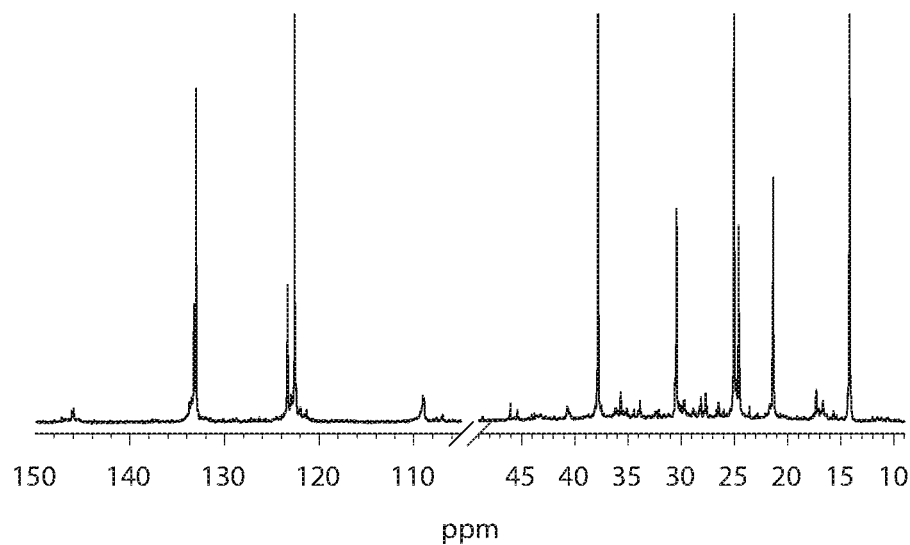
Figure 27:
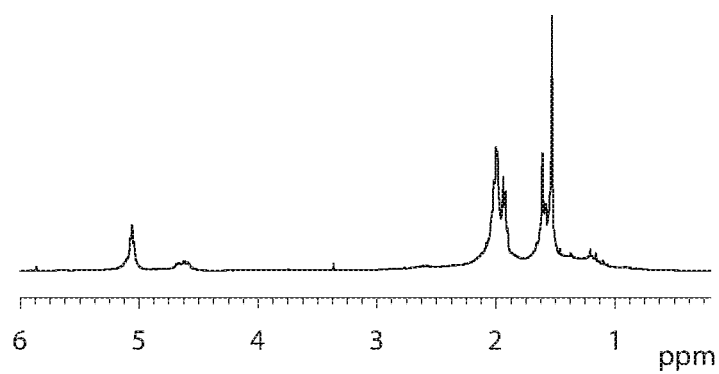

In FIG. 27 the $^1$H-NMR (below) and $^{13}$C-NMR (above) spectra of the obtained polyisoprene are reported.

Example 37 (IP79)

2 ml of isoprene equal to about 1.34 g were introduced in a test tube of 25 ml. Then, 7.4 ml of toluene were added and the temperature of the solution thus obtained was brought to 20° C. Then, methylaluminoxane-dry (MAO-dry) in toluene solution (6.3 ml; $1.0 \times 10^{-2}$ moles, equal to about 0.58 g) was added and, then, the $VCl_3(L5)$ (THF) complex (sample IP55) (2.33 ml of toluene suspension at a concentration equal to 2 mg/ml; $1 \times 10^{-5}$ moles, equal to about 4.66 mg) obtained as described in Example 13. The whole was maintained, under magnetic stirring, at 20° C., for 21 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.647 g of polyisoprene having a cis-1,4/trans-1,4/3,4 mixed structure having a content of trans-1,4 and cis-1,4 units equal to 77.2%: further characteristics of the process and of the polyisoprene obtained are reported in Table 2.

Figure 28:
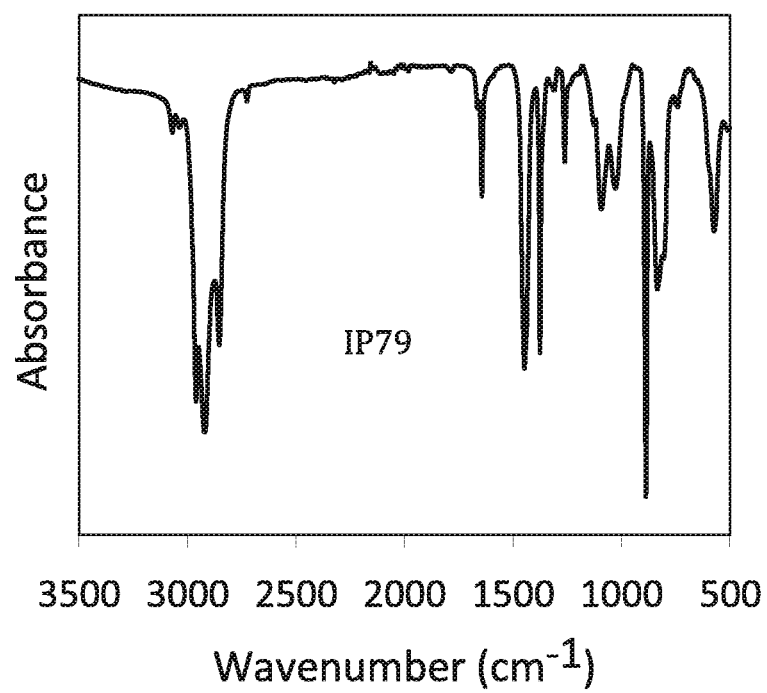

In FIG. 28 the FT-IR spectrum of the polyisoprene obtained ("Absorbance"; "Wavenumber") is reported.

Figure 29:
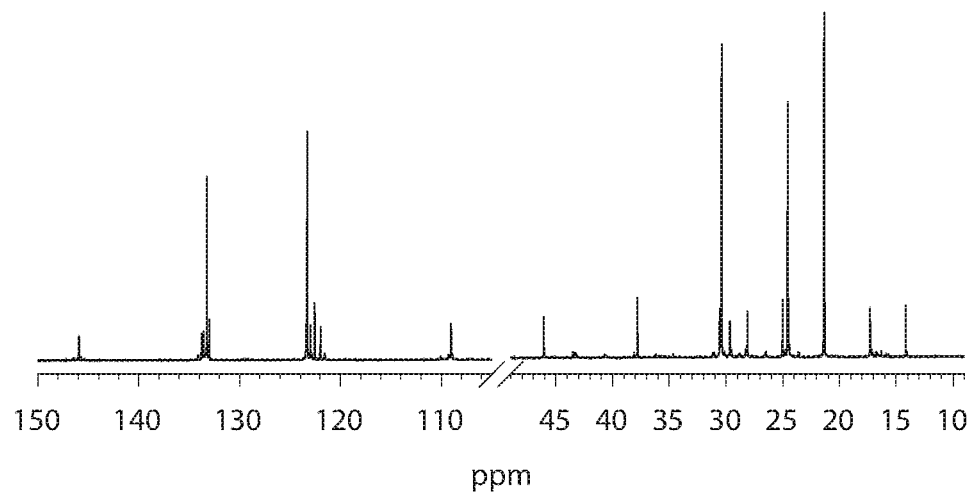
Figure 29:
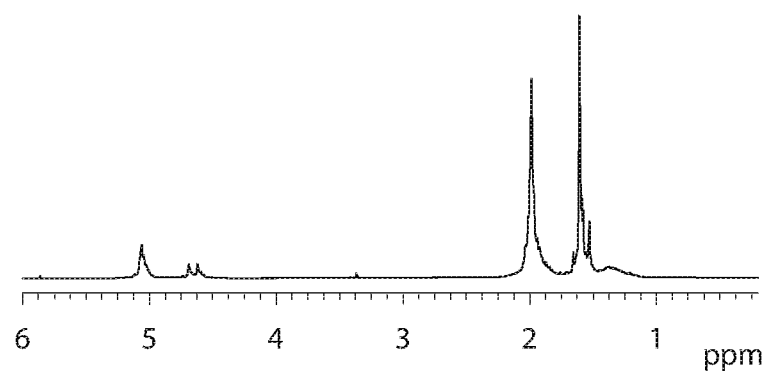

In FIG. 29 the $^1$H-NMR (below) and $^{13}$C-NMR (above) spectra of the obtained polyisoprene are reported.

Example 38 (IP80)

2 ml of isoprene equal to about 1.34 g were introduced in a test tube of 25 ml. Then, 7.4 ml of toluene were added and the temperature of the solution thus obtained was brought to 20° C. Then, methylaluminoxane (MAO) in toluene solution (6.3 ml; $1 \times 10^{-2}$ moles, equal to about 0.58 g) was added and, then, the $VCl_3(L5)$ (THF) complex (sample IP55) (2.33 ml of toluene suspension at a concentration equal to 2 mg/ml; $1 \times 10^{-5}$ moles, equal to about 4.66 mg) obtained as described in Example 13. The whole was maintained, under magnetic stirring, at 20° C., for 21 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.235 g of polyisoprene having a cis-1,4/trans-1,4/3,4 mixed structure having a content of trans-1,4 and cis-1,4 units equal to 80.9%: further characteristics of the process and of the polyisoprene obtained are reported in Table 2.

Figure 30:
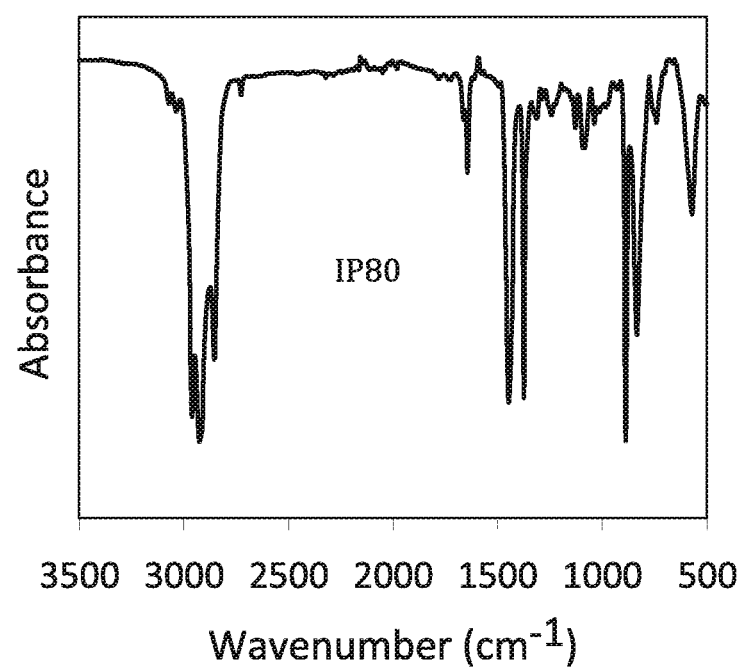

In FIG. 30 the FT-IR spectrum of the polyisoprene obtained ("Absorbance"; "Wavenumber") is reported.

Figure 31:
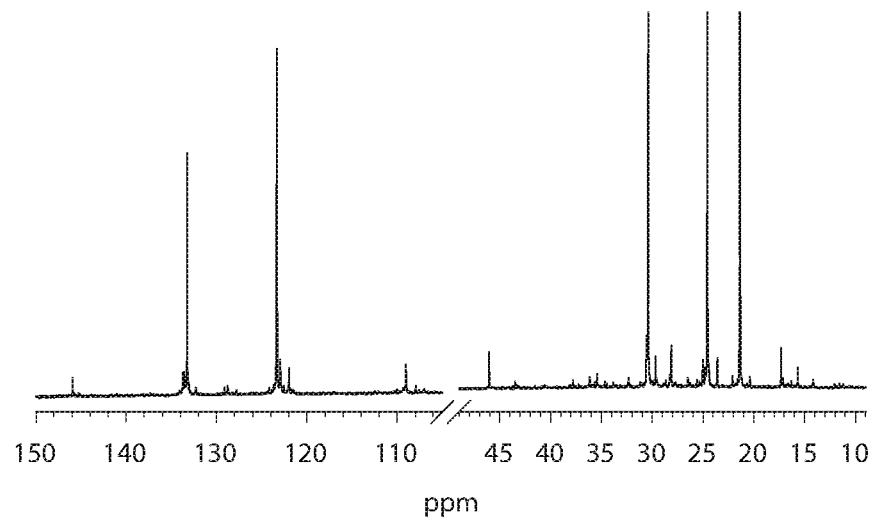
Figure 31:
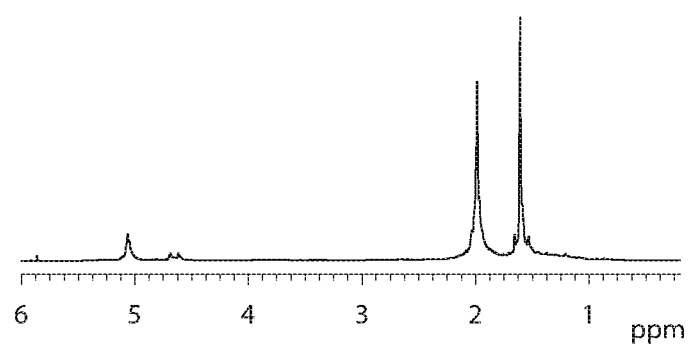

In FIG. 31 the $^1$H-NMR (below) and $^{13}$C-NMR (above) spectra of the obtained polyisoprene are reported.

Figure 32:
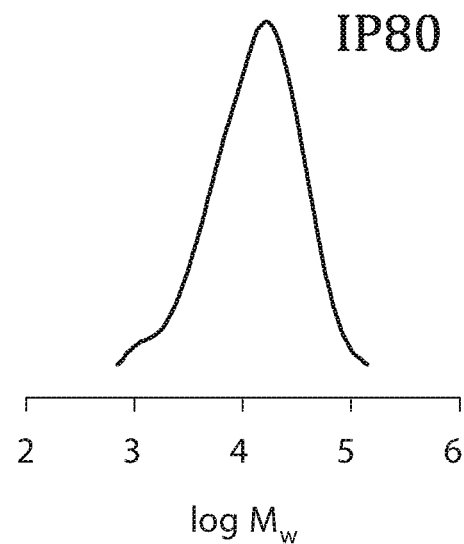

In FIG. 32 the GPC curve ("Gel Permeation Chromatography") of the obtained polyisoprene is reported.

Example 39 (IP81)

2 ml of isoprene equal to about 1.34 g were introduced in a test tube of 25 ml. Then, 7.1 ml of toluene were added and the temperature of the solution thus obtained was brought to 20° C. Then, methylaluminoxane-dry (MAO-dry) in toluene solution (6.3 ml; $1 \times 10^{-2}$ moles, equal to about 0.58 g) was added and, then, the $VCl_3(L8)$ complex (sample IP68) (2.61 ml of toluene suspension at a concentration equal to 2 mg/ml; $1 \times 10^{-5}$ moles, equal to about 5.22 mg) obtained as described in Example 16. The whole was maintained, under magnetic stirring, at 20° C., for 21 hours. The polymerization was then quenched by adding 2 ml of methanol containing some drops of hydrochloric acid. The obtained polymer was then coagulated by adding 40 ml of a methanol solution containing 4% of Irganox® 1076 (Ciba) antioxidant obtaining 0.14 g of polyisoprene having a cis-1,4/trans-1,4/3,4 mixed structure having a content of trans-1,4 and cis-1,4 units equal to 80.6%: further characteristics of the process and of the polyisoprene obtained are reported in Table 2.

Figure 33:
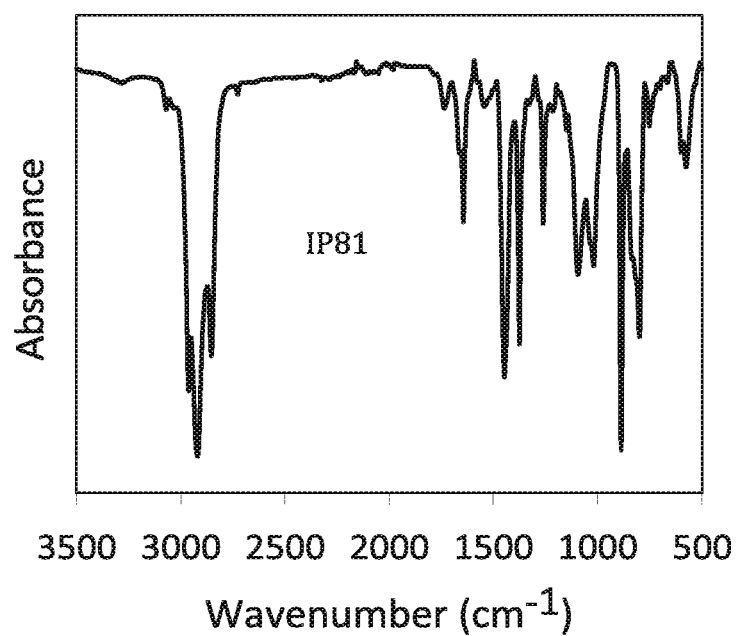

In FIG. 33 the FT-IR spectrum of the polyisoprene obtained ("Absorbance"; "Wavenumber") is reported.

Figure 34:
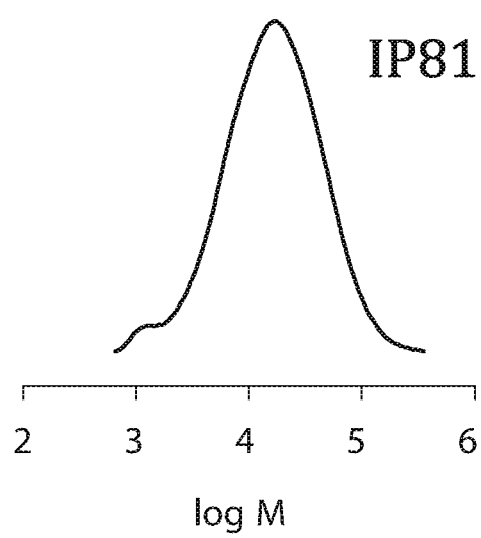

In FIG. 34 the GPC curve ("Gel Permeation Chromatography") of the obtained polyisoprene is reported.

TABLE 1

Polymerization of 1,3-butadiene with catalytic systems comprising vanadium bis-imine complexes

| Example | Temperature (° C.) | Time (h) | Conversion (%) | cis-1,4 (%) | trans-1,4 (%) | 1,2 (%) | $M_w$ (g × mol$^{-1}$) | $M_w/M_n$ |
|---|---|---|---|---|---|---|---|---|
| 17 | 20 | 5 | 15.4 | 80.5 | 5.0 | 14.5 | 65000 | 2.0 |
| 18 | 20 | 5 | 23.4 | 82.9 | 2.8 | 14.3 | 125000 | 2.5 |
| 19 | 20 | 5 | 12.2 | 66.8 | 19.1 | 14.1 | 39000 | 1.8 |
| 20 | 20 | 5 | 18.3 | 64.7 | 21.8 | 13.5 | 95000 | 2.0 |
| 21 | 20 | 5 | 21.4 | 78.1 | 7.6 | 14.2 | 52300 | 1.9 |
| 22 | 20 | 5 | 27.5 | 75.9 | 8.3 | 15.8 | 135000 | 2.2 |
| 23 | 20 | 5 | 31.6 | 65.9 | 16.1 | 18.0 | 48700 | 2.3 |
| 24 | 20 | 5 | 36.8 | 61.3 | 20.4 | 18.3 | 87800 | 2.4 |
| 25 | 20 | 5 | 50.6 | 77.0 | 3.4 | 19.6 | 63000 | 2.5 |
| 26 | 20 | 5 | 72.9 | 61.8 | 15.4 | 22.8 | 115800 | 2.4 |
| 27 | 20 | 22 | 67.9 | 68.7 | 3.4 | 27.9 | 89800 | 2.6 |
| 28 | 20 | 5 | 11.2 | 63.3 | 18.9 | 17.8 | 42300 | 2.5 |
| 29 | 20 | 5 | 27 | 59.9 | 16.7 | 23.4 | 105000 | 2.4 |
| 30 | 20 | 70 | 59.7 | 61.5 | 14.5 | 24.0 | 59200 | 3.2 |
| 31 | 20 | 5 | 47.8 | 72.7 | 5.2 | 22.1 | 74500 | 2.7 |
| 32 | 20 | 5 | 66.3 | 68.7 | 18.5 | 12.8 | 148000 | 2.5 |
| 33 | 20 | 5 | 2.9 | 66.0 | 4.0 | 30.0 | 67600 | 2.8 |
| 34 | 20 | 3 | 85 | 61.4 | 10.2 | 28.4 | 111000 | 3.3 |
| 35 | 20 | 24 | 9.4 | 62.6 | 9.8 | 27.6 | 77900 | 3.0 |

TABLE 2

Polymerization of isoprene with catalytic systems compriding vanadium bis-imine complexes

| Example | Temperature (° C.) | Time (h) | Conversion (%) | cis-1,4 (%) | trans-1,4 (%) | 3,4 (%) | $M_w$ (g × mol$^{-1}$) | $M_w/M_n$ |
|---|---|---|---|---|---|---|---|---|
| 36 | 20 | 21 | 19.1 | 36.7 | 47.9 | 15.4 | 43700 | 2.6 |
| 37 | 20 | 21 | 47.6 | 70.6 | 6.6 | 22.8 | 105000 | 3.1 |
| 38 | 20 | 21 | 17.3 | 80.9 | 0 | 19.1 | 18900 | 2.3 |
| 39 | 20 | 21 | 10.3 | 73.8 | 6.8 | 19.4 | 24900 | 2.6 |

The invention claimed is:

1. A process for preparing a (co)polymer of conjugated dienes, comprising polymerizing at least one conjugated diene in the presence of a catalytic system comprising at least one vanadium bis-imine complex having formula (I):

wherein:
m is 0 or 1;

Z represents a —CR$_5$R$_6$ group wherein R$_5$ and R$_6$ independently represent a hydrogen atom; or a C$_1$-C$_{20}$ alkyl group, linear or branched; or a bivalent aromatic group optionally substituted;

R$_1$ and R$_2$ are independently selected from the group consisting of a hydrogen atom, a C$_1$-C$_{20}$ alkyl group, linear or branched, optionally halogenated, and a cycloalkyl group optionally substituted; or R$_1$ and R$_2$, optionally bound to each other so as to form, together with the other atoms which they are bound to, a cycle comprising from 4 to 6 carbon atoms, saturated, unsaturated, or aromatic, optionally substituted by one or more C$_1$-C$_{20}$ alkyl groups, linear or branched, said cycle optionally comprising one or more heteroatoms;

R$_3$ and R$_4$ are independently selected from the group consisting of a hydrogen atom, a C$_1$-C$_{20}$ alkyl group, linear or branched, optionally halogenated, a cycloalkyl group optionally substituted, and an aryl group optionally substituted;

or R$_2$ and R$_4$ optionally bound to each other so as to form, together with the other atoms which they are bound to, a cycle comprising from 3 to 6 carbon atoms, saturated, unsaturated, or aromatic, optionally substituted by one or more C$_1$-C$_{20}$ alkyl groups, linear or branched, said cycle optionally comprising one or more heteroatoms;

or R$_1$ and R$_3$ optionally bound to each other so as to form, together with other atoms which they are bound to, a cycle comprising from 3 to 6 carbon atoms, saturated, unsaturated, or aromatic, optionally substituted by one or more C$_1$-C$_{20}$ alkyl groups, linear or branched, said cycle optionally comprising one or more heteroatoms;

X$_1$, X$_2$ and X$_3$ are independently selected from the group consisting of a halogen atom, a C$_1$-C$_{20}$ alkyl group, linear or branched, an —OCOR$_7$ group, and an —OR$_7$ group wherein R$_7$ is a C$_1$-C$_{20}$ alkyl group, linear or branched;

Y is an ether; and n is 0 or 1.

2. The process of claim 1, wherein said catalytic system comprises at least one co-catalyst (b), which is an organic compound of an M' element different from carbon, said M' element being selected from the group consisting of elements belonging to the groups 2, 12, 13 and 14 of the Periodic Table of the Elements.

3. The process of claim 2, wherein said co-catalyst (b) is ($b_1$) an aluminum alkyl having formula (II):

$$Al(X')_n(R_8)_{3-n} \quad (II)$$

wherein X' represents a halogen atom; $R_8$ is selected from the group consisting of a linear or branched $C_1$-$C_{20}$ alkyl group, a cycloalkyl group, and an aryl group, said groups being optionally substituted by one or more silicon or germanium atoms; and n is an integer ranging from 0 to 2.

4. The process of claim 2, wherein said co-catalyst (b) comprises ($b_2$) an organo-oxygenated compound of an M' element different from carbon, said M' element belonging to the groups 13 and 14 of the Periodic Table of the Elements.

5. The process of claim 2, wherein said co-catalyst (b) comprises ($b_3$) a compound or mixture of organo-metallic compounds of an M' element different from carbon, which is capable of reacting with the vanadium bis-imine complex having formula (I) and extracting from the vanadium bis-imine complex having formula (I) a $X_1$, $X_2$ or $X_3$ substituent σ-bound, to form on one hand at least one neutral compound, and on the other hand an ionic compound consisting of a cation comprising the metal (V) coordinated by the ligand, and from a non-coordinating organic anion comprising the M' metal, whose negative charge is delocalized on a multicenter structure.

6. The process of claim 1, wherein said conjugated diene is at least one selected from the group consisting of: 1,3-butadiene, 2-methyl-1,3-butadiene (isoprene), 2,3-dimethyl-1,3-butadiene, 1,3-pentadiene, 1,3-hexadiene, and cyclo-1,3-hexadiene.

7. The process of claim 1, wherein in said vanadium bis-imine complex having formula (I):

m is 0;

$R_1$ and $R_2$ are independently selected from the group consisting of a hydrogen atom and a linear or branched $C_1$-$C_{20}$ alkyl group;

$R_3$ and $R_4$ are independently a phenyl group optionally substituted by one or more linear or branched $C_1$-$C_{20}$ alkyl groups;

$X_1$, $X_2$ and $X_3$ are independently a halogen atom;

n is 0 or 1; and

Y is tetrahydrofuran (THF).

8. The process of claim 3, wherein said aluminum alkyl ($b_1$) having formula (II) is di-ethyl-aluminum chloride (DEAC), mono-ethyl-aluminum dichloride (EADC), or ethylaluminumsesquichloride (EASC).

9. The process of claim 4, wherein said organo-oxygenated compound ($b_2$) is one or more aluminoxanes having formula (III):

$$(R_9)_2-Al-O-[-Al(R_{10})-O-]_p-Al-(R_{11})_2 \quad (III)$$

wherein $R_9$, $R_{10}$ and $R_{11}$ are independently selected from the group consisting of a hydrogen atom, a halogen atom, a linear or branched $C_1$-$C_{20}$ alkyl group, a cycloalkyl group, and an aryl group, said groups being optionally substituted by one or more silicon or germanium atoms; and p is an integer ranging from 0 to 1000.

10. The process of claim 9, wherein said organo-oxygenated compound ($b_2$) is methylaluminoxane (MAO).

11. The process of claim 5, wherein said compound or mixture of compounds ($b_3$) is an organic compound of aluminum or boron.

12. The process of claim 1, wherein said process is carried out in the presence of at least one inert organic solvent selected from the group consisting of: a saturated aliphatic hydrocarbon; a saturated cyclo-aliphatic hydrocarbon; a mono-olefin; an aromatic hydrocarbon; and a halogenated hydrocarbon.

13. The process of claim 12, wherein a concentration of the conjugated diene to be (co)polymerized in said inert organic solvent is from 5% by weight to 50% by weight, with respect to a total weight of the conjugated diene and the inert organic solvent.

14. The process of claim 1, wherein said process is carried out at a temperature ranging from −70° C. to +100° C.

* * * * *